United States Patent
Jeon et al.

(10) Patent No.: US 10,519,586 B2
(45) Date of Patent: Dec. 31, 2019

(54) SENSING DEVICE

(71) Applicant: LG ELECTRONICS INC., Seoul (KR)

(72) Inventors: Chansung Jeon, Seoul (KR); Jonghoon Shim, Seoul (KR); Sangjun Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 15/256,811

(22) Filed: Sep. 6, 2016

(65) Prior Publication Data

US 2017/0067201 A1    Mar. 9, 2017

(30) Foreign Application Priority Data

Sep. 3, 2015  (KR) .................. 10-2015-0124846

(51) Int. Cl.
| | |
|---|---|
| *D06F 39/00* | (2006.01) |
| *G01D 11/24* | (2006.01) |
| *D06F 29/02* | (2006.01) |
| *D06F 33/02* | (2006.01) |
| *G08B 21/18* | (2006.01) |
| *G08C 23/04* | (2006.01) |
| *H04Q 1/02* | (2006.01) |
| *H04Q 9/00* | (2006.01) |

(52) U.S. Cl.
CPC ............ *D06F 39/005* (2013.01); *D06F 29/02* (2013.01); *D06F 33/02* (2013.01); *D06F 39/003* (2013.01); *G08B 21/18* (2013.01)

(58) Field of Classification Search
None
See application file for complete search history.

(56) References Cited

U.S. PATENT DOCUMENTS

| | | | | |
|---|---|---|---|---|
| 4,857,679 A | * | 8/1989 | Bennett ................. | G08B 25/12 200/300 |
| 4,916,439 A | * | 4/1990 | Estes ...................... | G08B 1/08 340/539.1 |
| 5,089,809 A | * | 2/1992 | Carmichael, Jr. ... | H02J 13/0024 340/533 |
| 5,609,492 A | * | 3/1997 | Sato ................... | H01R 13/5213 220/3.8 |
| 6,424,252 B1 | * | 7/2002 | Adler ................... | D06F 39/005 340/311.2 |

(Continued)

FOREIGN PATENT DOCUMENTS

| | | |
|---|---|---|
| KR | 10-1999-0005841 | 1/1999 |
| KR | 100778713 | 11/2007 |

(Continued)

OTHER PUBLICATIONS

European Search Report in European Application No. 16187228.8, dated Mar. 16, 2017, 11 pages (with English translation).

*Primary Examiner* — Benyam Haile
*Assistant Examiner* — Muhammad Adnan
(74) *Attorney, Agent, or Firm* — Fish & Richardson P.C.

(57) ABSTRACT

A sensing device includes a first unit which includes a sensing module, a battery, and a connector for charging the battery, and a second unit to which the first unit is detachably coupled. The connector is accommodated in the second unit and thus is blocked from being exposed to the outside in a state where the first unit is coupled to the second unit.

16 Claims, 20 Drawing Sheets

(56) References Cited

U.S. PATENT DOCUMENTS

| | | | | |
|---|---|---|---|---|
| 6,744,628 B2* | 6/2004 | Olesiewicz | H02M 7/003 | 307/26 |
| 7,026,948 B1* | 4/2006 | Rutter | G08B 17/10 | 340/627 |
| 7,474,517 B2* | 1/2009 | Skinner | G06F 13/4095 | 361/108 |
| 8,888,515 B2* | 11/2014 | Hachadorian | H01R 13/5213 | 439/142 |
| 9,146,560 B2* | 9/2015 | Burnett | G05D 1/0272 | |
| 9,485,477 B2* | 11/2016 | DiPoala | G08B 17/00 | |
| 9,714,762 B2* | 7/2017 | Wu | F21S 8/00 | |
| 9,749,455 B2* | 8/2017 | Chung | H04L 45/306 | |
| 9,793,729 B2* | 10/2017 | Hsia | H02J 7/0054 | |
| 2002/0038553 A1* | 4/2002 | Yun | F25D 29/00 | 62/126 |
| 2003/0058101 A1* | 3/2003 | Watanabe | G08B 13/1418 | 340/540 |
| 2003/0163287 A1* | 8/2003 | Vock | A43B 3/0005 | 702/187 |
| 2004/0145483 A1* | 7/2004 | Pilkington | G08B 17/10 | 340/628 |
| 2005/0232447 A1* | 10/2005 | Shinozuka | H04R 23/008 | 381/122 |
| 2006/0111815 A1* | 5/2006 | Schanin | F25D 29/00 | 700/276 |
| 2008/0276407 A1 | 11/2008 | Schnittman et al. | | |
| 2009/0064867 A1* | 3/2009 | Peng | A47J 43/0716 | 99/331 |
| 2010/0182136 A1* | 7/2010 | Pryor | G01F 23/292 | 340/425.5 |
| 2011/0068936 A1* | 3/2011 | Shimada | G08B 17/10 | 340/584 |
| 2011/0248846 A1 | 10/2011 | Belov et al. | | |
| 2012/0058845 A1* | 3/2012 | Crowley | A63B 41/00 | 473/604 |
| 2012/0235822 A1* | 9/2012 | Barson | G08B 17/107 | 340/630 |
| 2013/0106613 A1* | 5/2013 | Lee | H04W 4/021 | 340/691.3 |
| 2013/0134183 A1* | 5/2013 | Van Diepen | A47K 5/1202 | 222/52 |
| 2013/0151703 A1* | 6/2013 | Nakaso | H04Q 9/00 | 709/224 |
| 2013/0214935 A1* | 8/2013 | Kim | H04L 12/2816 | 340/870.02 |
| 2013/0311610 A1* | 11/2013 | Kim | H04L 12/2818 | 709/217 |
| 2014/0086535 A1* | 3/2014 | Yee | G02B 6/4293 | 385/88 |
| 2014/0106672 A1* | 4/2014 | Jeon | H04B 5/0031 | 455/41.1 |
| 2014/0109937 A1* | 4/2014 | Arnold | A61B 5/14503 | 134/22.1 |
| 2014/0132418 A1* | 5/2014 | Lill | G05B 19/0428 | 340/679 |
| 2015/0002274 A1* | 1/2015 | Sengstaken, Jr. | G06K 7/10009 | 340/10.34 |
| 2015/0028751 A1* | 1/2015 | Dobbins | H05B 33/0854 | 315/155 |
| 2015/0154427 A1* | 6/2015 | Barnes | G06Q 10/0833 | 340/10.5 |
| 2015/0167222 A1 | 6/2015 | Hwang et al. | | |
| 2015/0212500 A1* | 7/2015 | Akabane | G05D 1/0274 | 700/275 |
| 2015/0294553 A1* | 10/2015 | Logan | G05B 19/042 | 340/539.1 |
| 2016/0036958 A1* | 2/2016 | Logan | H04W 4/80 | 455/414.1 |
| 2016/0147207 A1* | 5/2016 | Park | G08C 17/00 | 700/275 |
| 2016/0171859 A1* | 6/2016 | Bowlus | G08B 21/02 | 340/457 |
| 2016/0262594 A1* | 9/2016 | Chan | A47L 15/4293 | |
| 2016/0275769 A1* | 9/2016 | McIntosh | G08B 13/2414 | |
| 2016/0338531 A1* | 11/2016 | McIntyre | G08C 17/02 | |

FOREIGN PATENT DOCUMENTS

| | | |
|---|---|---|
| KR | 10-2014-0032648 | 3/2014 |
| KR | 10-2015-0099430 | 8/2015 |
| WO | 2015-0036229 | 3/2015 |

\* cited by examiner

| | 🔋 1:00PM |
|---|---|
| ← REFRIGERATOR SENSOR | ⓘ |
| CONNECTING HOUSEHOLD APPLIANCE | REFRIGERATOR \| OUR HOME TREASURE WAREHOUSE |
| PRODUCT NICKNAME | REFRIGERATOR SENSOR |
| SENSOR FOOD SETTING | EGG/21 |
| 🥚 EGG — 526 | 20 DAYS LEFT |
| PUSH NOTIFICATION | ON — 521 |
| ✓ STORAGE PERIOD NOFITICAITION | — 522 |
| ✓ REFRIGERATOR UNUSED-STATE NOTIFICAITION MESSAGE IS DELIVERED TO SET PHONE NUMBER AT TIME OF UNUSED STATE OF REFRIGERATOR DURING SETTING PERIOD. | — 523 |
| SETTING PERIOD | TEN DAYS ⌄ |
| 9 10DAYS 11 | — 524 |
| RECEIVED PHONE NUMBER | 010-1234-5678 — 525 |
| BATTERY | HIGH |

SENSING DEVICE

CROSS-REFERENCE TO RELATED APPLICATIONS

The present application claims priority under 35 U.S.C. 119 and 35 U.S.C. 365 to Korean Patent Application No. 10-2015-0124846 (filed on Sep. 3, 2015), which is hereby incorporated by reference in its entirety.

BACKGROUND

Nowadays, a communication module is provided on household appliances in order to import various smart function other than the original functions of the household appliances. A variety of information from the outside by using the communication module may be obtained.

However, in a case where the communication module is provided on the household appliances and various smart function are added to the household appliances, the cost of the household appliances may be increased.

Some of the users may not want to use the smart function added to the household appliances. In addition, in a case where the communication module is included in the household appliances, there is a problem that does not meet the needs of the user, since the user pays additional costs comparing to the household appliances which does not have the communication module.

On the other hands, in a case where the household appliances does not have the communication module, the function of the household appliances is limited. In a case where the user wants to use the smart function, there is a problem that must additionally buy household appliances comprising a smart function.

Meanwhile, in the Korea Patent Application Publication No. 10-2012-0075572 (published date: Jul. 9, 2012) as a related art, an energy consumption unit is disclosed having a communication modem.

SUMMARY

The present invention is to provide a sensing device which is capable of providing an additional function addition to the original function in the household appliances.

The present invention is to provide a sensing device which is capable of determining and monitoring the state of the household appliances.

The present invention is to provide a sensing device which is capable of determining the state of the household appliances and transmitting information about the state of the household appliances to an external device.

The present invention is to provide a sensing device which is capable of transferring an operating command which is transferred from the external of a space in which the household appliances are located to the household appliances.

A sensing device includes a first unit which includes a sensing module, a battery, and a connector for charging the battery; and a second unit to which the first unit is detachably coupled. The connector is accommodated in the second unit and thus is blocked from being exposed to an outside in a case where the first unit is coupled to the second unit.

A sensing device includes a sensing module having an acceleration sensor, a proximity sensor having a light emitting portion and a light receiving portion, a communication module which is capable of receiving information detected at the sensing module and includes a processor and a memory, and a battery for supplying power to the processor. The acceleration sensor causes the processor to be activated when the acceleration sensor detects a vibration greater than vibration for activated in a state where the processor is deactivated, and the processor compares information detected at the proximity sensor and reference information stored in the memory to each other when the processor is activated.

An sensing device according to another aspect is a sensing device which attaches to a washing apparatus to be used, and including an acceleration sensor; a communication module which includes a processor for determining a state of the washing apparatus based on information detected at the acceleration sensor and a memory and is capable of communicating with an external device; and a battery for supplies power to the processor. The processor detects spin-drying completion of the washing apparatus using the acceleration sensor and sends a washing end notification to an external device in a case where vibration is not detected until reference time lapses.

BRIEF DESCRIPTION OF THE DRAWINGS

FIG. 10 is a view illustrating a second screen displayed at a mobile device.

DETAILED DESCRIPTION OF THE EMBODIMENTS

Figure 1:
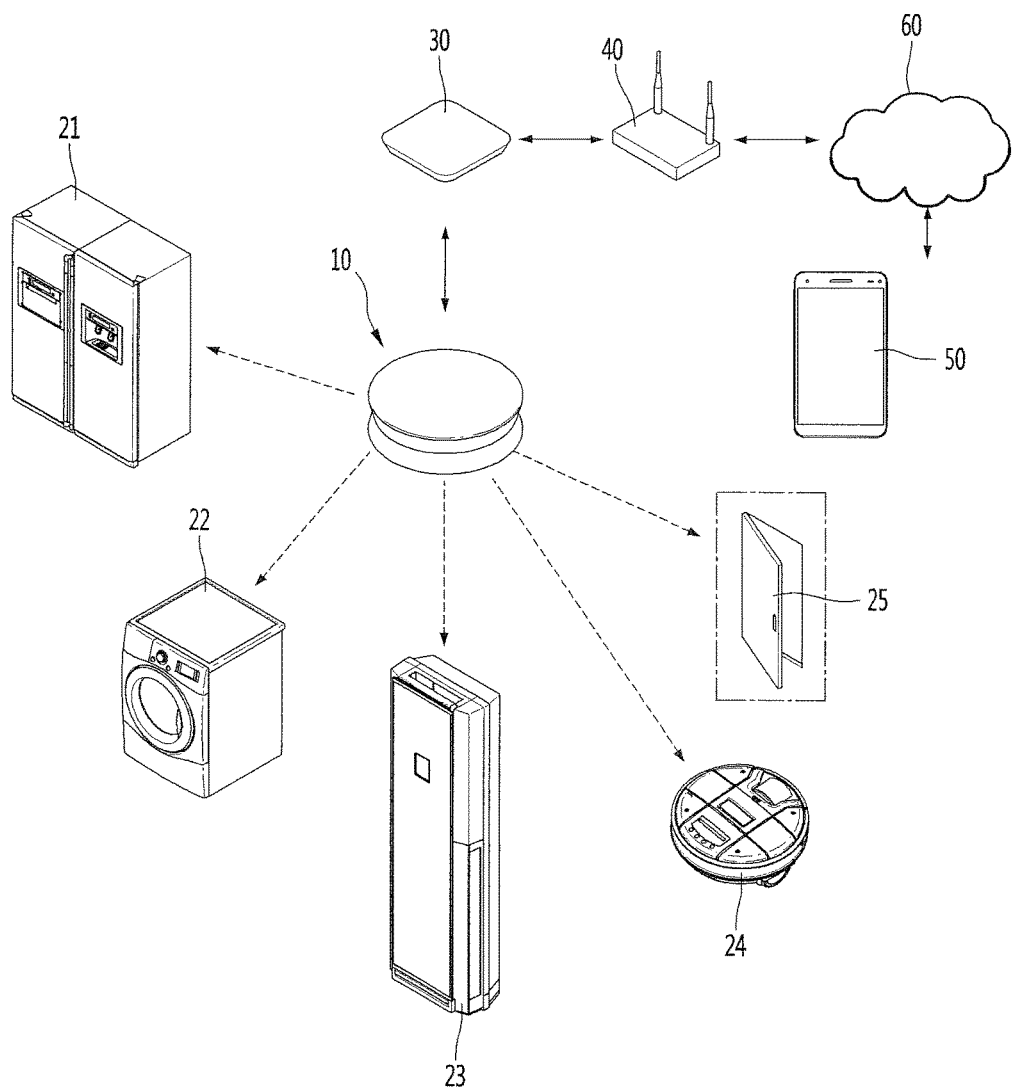
FIG. 1 is a view illustrated a network in which a sensing device according to an embodiment of the present invention is joined.

Hereinafter, exemplary embodiments of the present disclosure will be described in detail with reference to the exemplary drawings. Regarding the reference numerals assigned to the elements in the drawings, it should be noted that the same elements may be designated by the same reference numerals, wherever possible, even though they are shown in different drawings. Also, in the description of embodiments of the present invention, detailed description of well-known related structures or functions may be omitted when it is deemed that such description may cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

FIG. 1 is a view illustrated a network in which a sensing device according to an embodiment of the present invention is joined.

With reference to FIG. 1, the sensing device 10 of the present invention is capable of communicating with an external device. The sensing device 10 may be used in a state of attaching to household appliances 21 to 24 requiring sensing, as an example.

The household appliances 21 to 24 may include at least one of a refrigerator 21, a washing apparatus 22, an air conditioner 23, the robot cleaner 24 or the like, but they are not limited to these. The washing apparatus 22 may include a washing machine for washing clothes, or the like, a dryer for drying clothes, or the like, a dishwasher for washing dishes, or the like.

In addition, the sensing device 10 may be used to provide an additional function to specific household appliances.

In addition, the sensing device 10 may be used to send commands related to operations to specific household appliances.

Further, the sensing device 10 may be used to detect a peripheral state of the sensing device regardless of the operation of the household appliances.

As an example, the sensing device 10 may be used in a state of being attached to the household appliances 21 to 24 or in a state of being attached to an indoor wall, a window, a door 25, or the like.

The sensing device 10 is capable of communicating with a gate way 30. The gate way 30 is capable of communicating with an external server 60 or a mobile device 50 by a router 40.

The server 60 is capable of storing and managing information which is transferred from the sensing device 10. The server 60 may be a server operated by a manufacturing company of the household appliances, a server operated by a manufacturing company of the sensing device 10, or a server operated by a company which is entrusted by a manufacturing company of the household appliances, but it is not limited to this.

The gate way 30 is capable of communicating with the sensing device 10 by a first communicating manner and is capable of communicating with the server 60 or the mobile device 50 by a second communicating manner.

Accordingly, the sensing device 10 enables communication between the server 60 and the mobile device 50 with each other.

Information sensed in the sensing device 10 is capable of sending to the mobile device 50 and the mobile device 50 is capable of displaying information received from the sensing device 10. The sensing device 10 is capable of receiving information from the mobile device 50 or is capable of receiving a command.

At this time, the sensing device 10 is capable of sending various piece of information to the server 60 and the server 60 is capable of sending a portion or all of the information receiving from the sensing device 10 to the mobile device 50. The server 60 is capable of sending the information itself received from the sensing device 10 to the mobile device 50. Alternatively, the server 60 is capable of processing the receiving information and then sending the processed information to the mobile device 50.

The sensing device 10 is capable of sending an operating command to the household appliances 21 to 24 in a case where the command received by the sensing device 10 is the operating command of the household appliances 21 to 24.

The sensing device 10 may refer to as a communication component since the sensing device 10 in the present specification is capable of performing a sensing function as well as performing communication with an external device.

Figure 2:
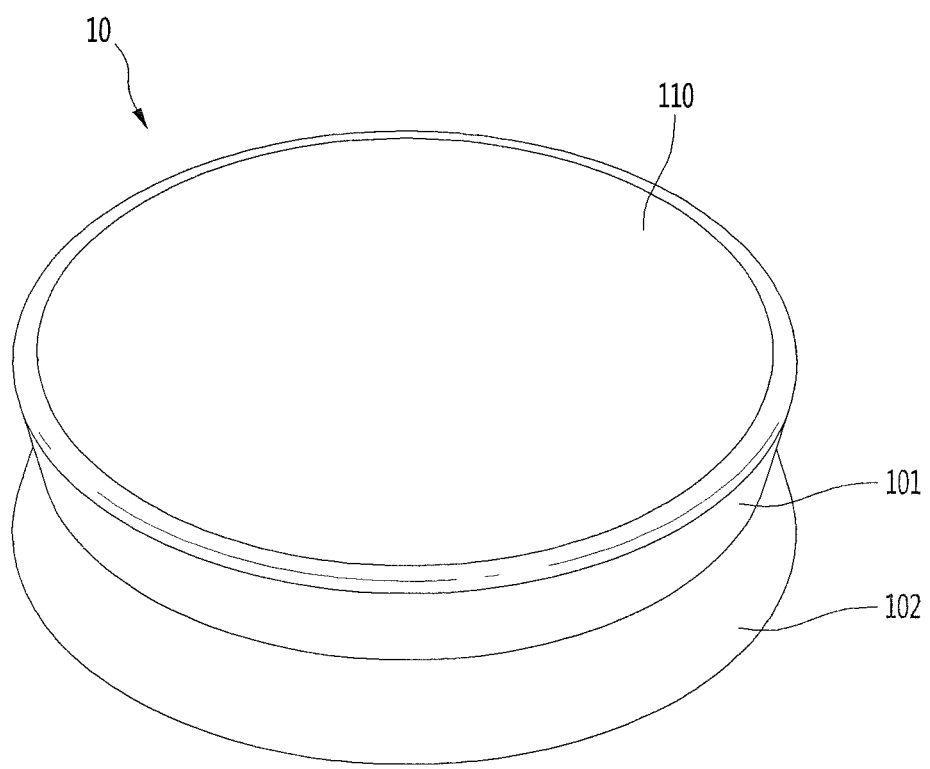
FIG. 2 is a perspective view illustrating a sensing device according to an embodiment of the present invention.
Figure 3:
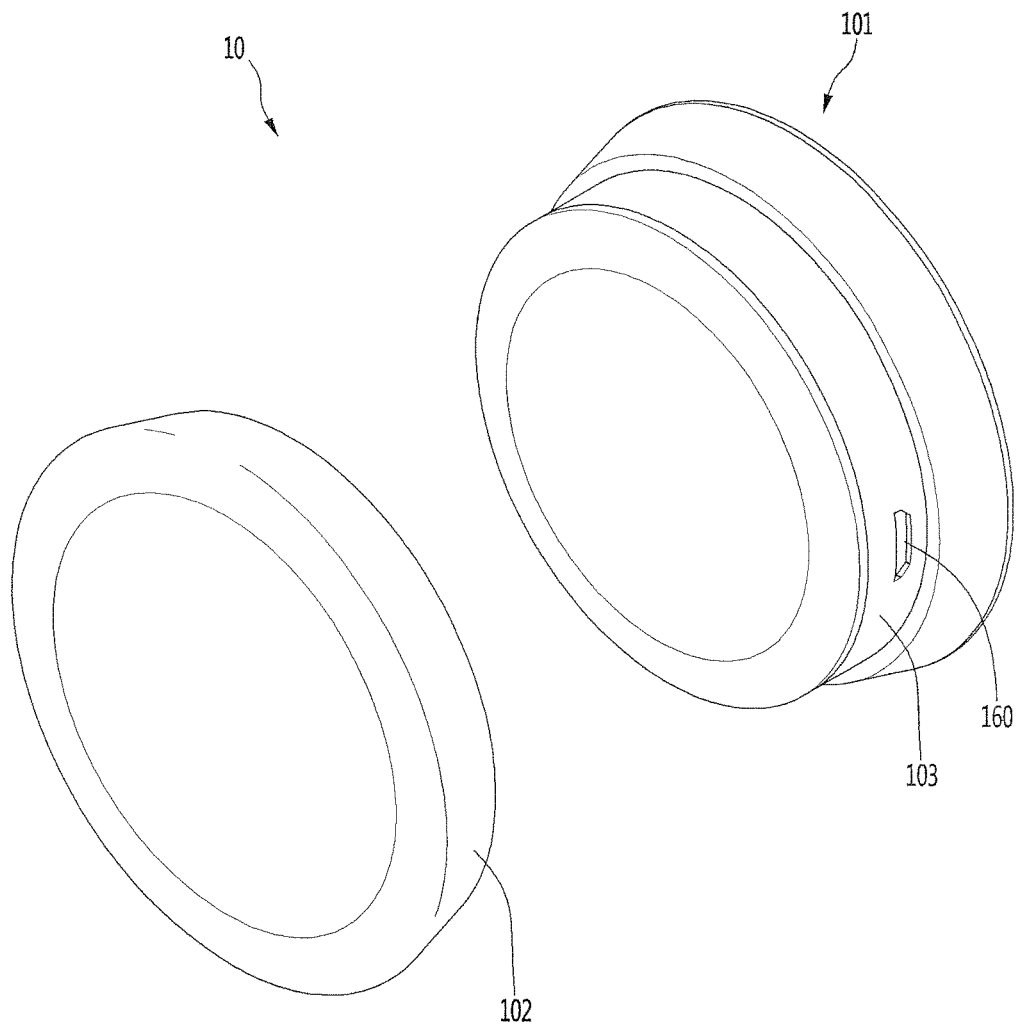
FIG. 3 is a view illustrating a state where the sensing device in FIG. 2 is separated into two portions.
Figure 4:
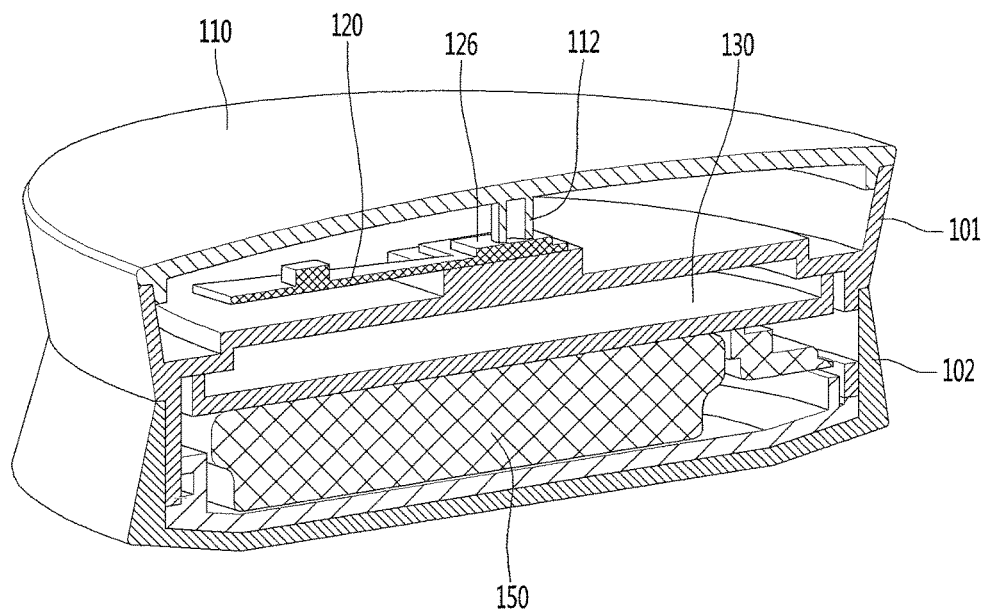
FIG. 4 is a cross-sectional view of the sensing device in FIG. 2.
Figure 5:
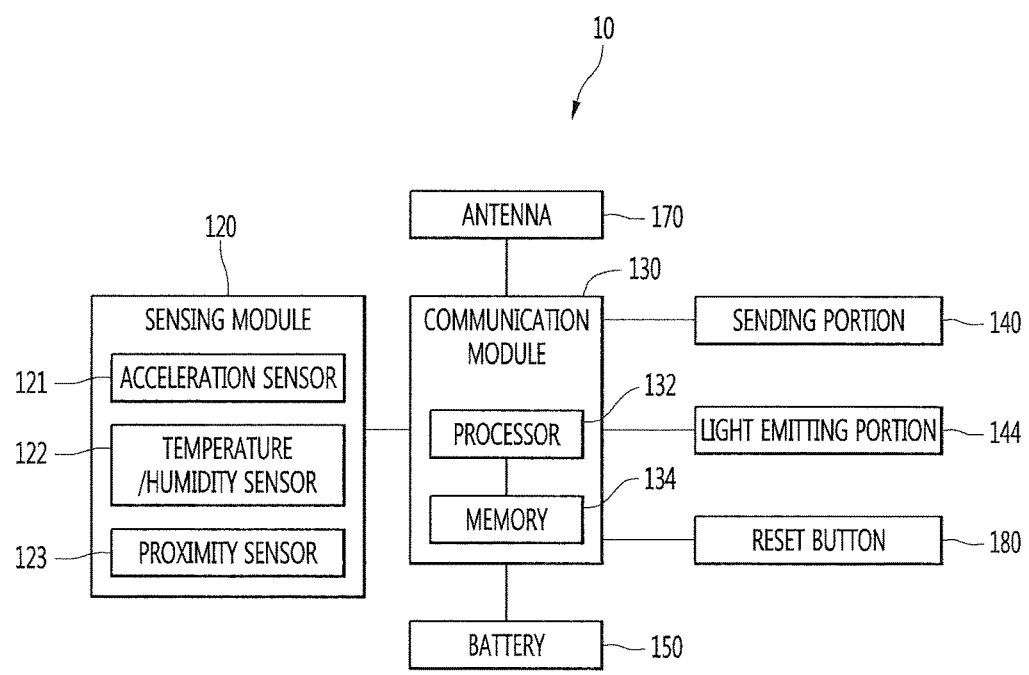
FIG. 5 is a block diagram of the sensing device in FIG. 2.

FIG. 2 is a perspective view illustrating a sensing device according to an embodiment of the present invention, FIG. 3 is a view illustrating a state where the sensing device in FIG. 2 is separated into two portions, FIG. 4 is a cross-sectional view of the sensing device in FIG. 2, and FIG. 5 is a block diagram of the sensing device in FIG. 2.

With reference to FIG. 2 to FIG. 5, the sensing device 10 may include a first unit 101 and a second unit 102 which is separably coupled with the first unit 101.

The second unit 102 may be attached to the household appliances 21 to 24, the wall, the door 25, or the like. As an example, the second unit 102 may be attached to the household appliances 21 to 24, the wall, the door 25, or the like by adhesives, double-side tapes, or the like.

The first unit 101 may be separated from the second unit 102 in a state the second unit 102 is fixed to a specific position.

The first unit 101 may include a communication module 130 for communication. The communication module 130 may be a Zigbee communication module, a Bluetooth communication module or a Wi-Fi communication module. However, there is no limit in the type of the communication module 130 in the present invention.

The first unit 101 may further include a sensing module 120.

The communication module 130 may include a processor 132 and a memory 134 and may be connected with an antenna 170.

The processor 132 is capable of comparing information sensed at the sensing module 120 and reference information stored in the memory 134 with each other.

A variety of reference information for determining whether or not various conditions is satisfied is stored in the memory 134.

In addition, the memory 134 is capable of storing information or a command transferred from the external device.

The sensing module 120 may include at least one sensor 121, 122, and 123.

As an example, the sensing module 120 may include the acceleration sensor 121.

Movement of products or the door to which the sensing device 10 is attached may be detected by the acceleration sensor 121.

The sensing module 120 may include a temperature and humidity sensor 122 for detecting a temperature and humidity. Alternatively, it is possible that the sensing module 120 includes any one only of a temperature sensor and a humidity sensor or the entirety of two sensors.

The sensing module 120 may include the proximity sensor 123 as an example. The proximity sensor 123 may be an infrared Sensor and is capable of detecting approach of a specific object to the sensing device 10, change of distance between the products or door to which the sensing device 10 is installed and surrounding structures, or the like.

The first unit 101 may further include a battery 150. The battery 150 may be a secondary battery which is capable of charging and discharging. The first unit 101 may further include a charging circuit for charging, but it is limited to this.

Here, so that the usage time of the battery 150 may be maximized, the processor 132 may be activated when vibration over a specific value is detected at the acceleration sensor 121, in a state where the processor 132 is deactivated.

When the processor 132 is activated, the processor 132 compares information detected at least one of the acceleration sensor 121, the temperature and humidity sensor 122, and the proximity sensor 123 to reference information stored in the memory 134 with each other.

The first unit 101 may further include a connector 160 for inputting power for charging of the battery 150.

A portion of the first unit 101 may be inserted in the second unit 102. Accordingly, the first unit 101 includes an inserting portion 103 for being inserted into the second unit 102 and the connector 160 is positioned on the inserting portion 130.

As in FIG. 2, when the inserting portion 103 of the first unit 101 is inserted into the second unit 102, the connector 160 is not exposed to an outside of the sensing device 101. Accordingly, it may be prevented foreign substances or water from being introduced into the connector 160 in a state where the first unit 101 and the second unit 102 is coupled with each other.

The first unit 101 may further include a sending unit 140 for sending a signal to the household appliances 21 to 24.

The sending unit 140 is capable of sending a signal including a command related to an operation to the household appliances 21 to 24. The sending unit 140 is capable of sending an infrared signal as an example.

However, the household appliances 21 to 24 are capable of receiving a signal receiving at the sending unit 140.

The first unit 101 may further include a light emitting portion 144 for displaying state information of the sensing device 10. The light emitting portion 144 may includes at least one LED, but it is not limited to this.

The light emitting portion 144 is capable of displaying a variety of information such as a state of battery 150, whether or not being connected to an external device (a server, a mobile device, or the like), an error generating state, or the like. Colors of light emitted from the light emitting portion 144 may be variable according to the state of battery 150, whether or not being connected to communicate with an external device (a server, a mobile device, or the like), the error generating state.

The first unit 101 may further include a pairing button 126 for connecting communication with an external device. The pairing button 126 may be positioned in the inside portion of the first unit 101.

The first unit 101 may include a transmitting portion 110 which forms a portion of an outer shape of the first unit 101. A light which is emitted from the light emitting portion 144 transmits through the transmitting portion 110. The transmitting portion 110 may be made of a plastic material or a glass material.

A pressing projection 112 may be provided in the transmitting portion 110 so that a user is capable of indirectly selecting the pairing button 126. The pressing projection 112 is projected from the transmitting portion 110 and may be disposed to facing the pairing button 126.

Accordingly, when a portion in which the pressing projection 112 is provided in the transmitting portion 110 is pressed by a user, the pairing button 126 may be selected by the pressing projection 112 pressing the pairing button 126.

The first unit 101 may further include a reset button 180. A function which is to perform by the sensing device 10 is stored in the memory 134. When the reset button 180 is selected, the information regarding to a predetermined function may be deleted from the memory 134 and then a new function may be selected by the mobile device 50.

In addition, the information (detected information) detected by the sensing device 10 is stored in the memory 134 while the selected function is performed by the sensing device 10. When the reset button 180 is selected, the detected information stored in the memory 134 may be deleted while the function of the sensing device 10 is maintained as the selected function.

The pairing process between the sensing device 10 and the mobile device 50 as an example of the external device will be simply described.

The mobile device 50 is capable of executing an application for using the sensing device 10 in order to performing the pairing the sensing device 10 and the mobile device 50 with each other and a user may select the pairing button 126 of the sensing device 10.

When the pairing button 126 is selected, the sensing device 10 is capable of sending inherent information of the sensing device 10 to the mobile device 50 and thus the mobile device 50 is capable of acquiring the information of the sensing device 10.

A list of the searched sensing devices 10 may be displayed on the display portion of the mobile device 50 and thus a specific sensing device 10 may be selected on the list.

A screen for setting a function of the selected sensing devices 10 may be displayed on the display portion of the mobile device 50 and thus the function of the sensing device 10 is set on the screen.

When the function of the sensing device 10 is set, a screen for selecting a household appliance to be interacted with the sensing device 10 may be displayed on the display portion of the mobile device 50. For example, in a case where the sensing device 10 is selected as a washing apparatus sensor, a household appliance to which the sensing device 10 is attached is selected on the display portion. At this time, the household appliance to which the sensing device 10 is to be attached may be registered to the server 60 through the mobile device 50 in advance.

When the function of the sensing device 10 is selected in the mobile device 50, guide information for guiding a position to which the sensing device 10 is to be attached per a selected household appliance or per a selected function may be displayed on the display portion of the mobile device 50.

For example, when the washing apparatus is selected as a household appliance, a guide message or a screen which guides to attach the sensing device 10 to the door of the washing apparatus may be displayed on the display portion.

When the refrigerator is selected as a household appliance, a guide message or a screen which guides to attach the sensing device 10 to one door of the refrigerator washing apparatus may be displayed.

When the robot cleaner is selected as a household appliance, a guide message or a screen which guides to attach the sensing device 10 to a position adjacent to an infrared receiver in the robot cleaner may be displayed on the display portion.

When the selected function is a door opening detecting function, a guide massage or a screen which guide an arrangement relationship between a reflector for reflecting light or a door frame/a window frame and a sensing device may be displayed on the display portion.

In addition, a function of the sensing device 10 in the mobile device 50 is selected, a guide message or a screen for requesting a test to a user in order to confirm whether or not an attaching position of the sensing device 10 is correct may be displayed on the display portion of the mobile device 50.

As an example, a guide message such as "Please, move the door to which the sensing device 10 is attached" may be displayed on the display portion.

In a case where a user moves the door to which the sensing device 10 is attached, movement of the door is capable of detecting at the acceleration sensor 121 of the sensing device 10 and then the information detected at the acceleration sensor 121 may be acquired by the mobile device 50.

In a case where the mobile device 50 acquires the information detected at the acceleration sensor 121, a screen for confirming the selected function may be displayed on the display portion of the mobile device 50.

The user confirms a function of the sensing device 10, the set function is sent to the sensing device 10 and then is stored in the memory 134 of the sensing device 10. Then, the sensing device 10 is capable to performing the set function.

Hereinafter, various functions of the sensing device 10 will be described.

Figure 6:
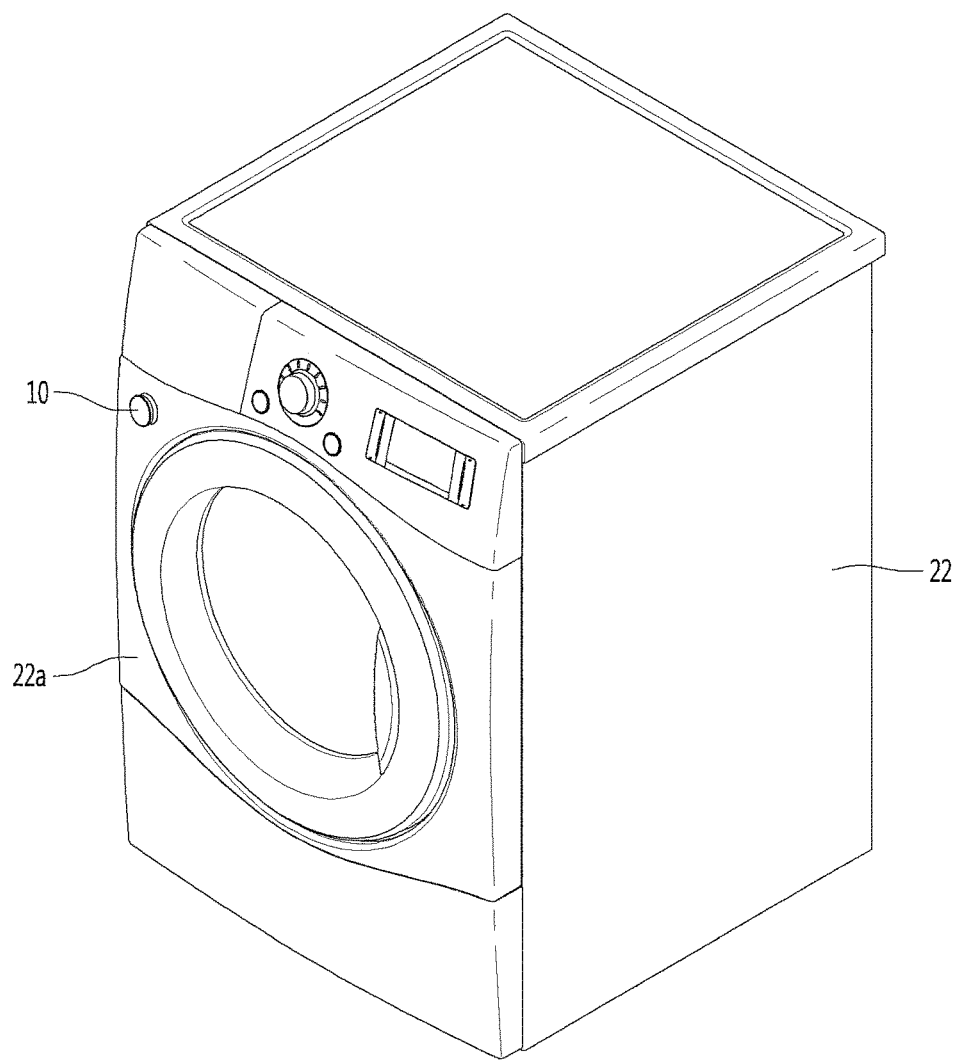
FIG. 6 is a view illustrating a state where the sensing device is attached to the washing device.
Figure 7:
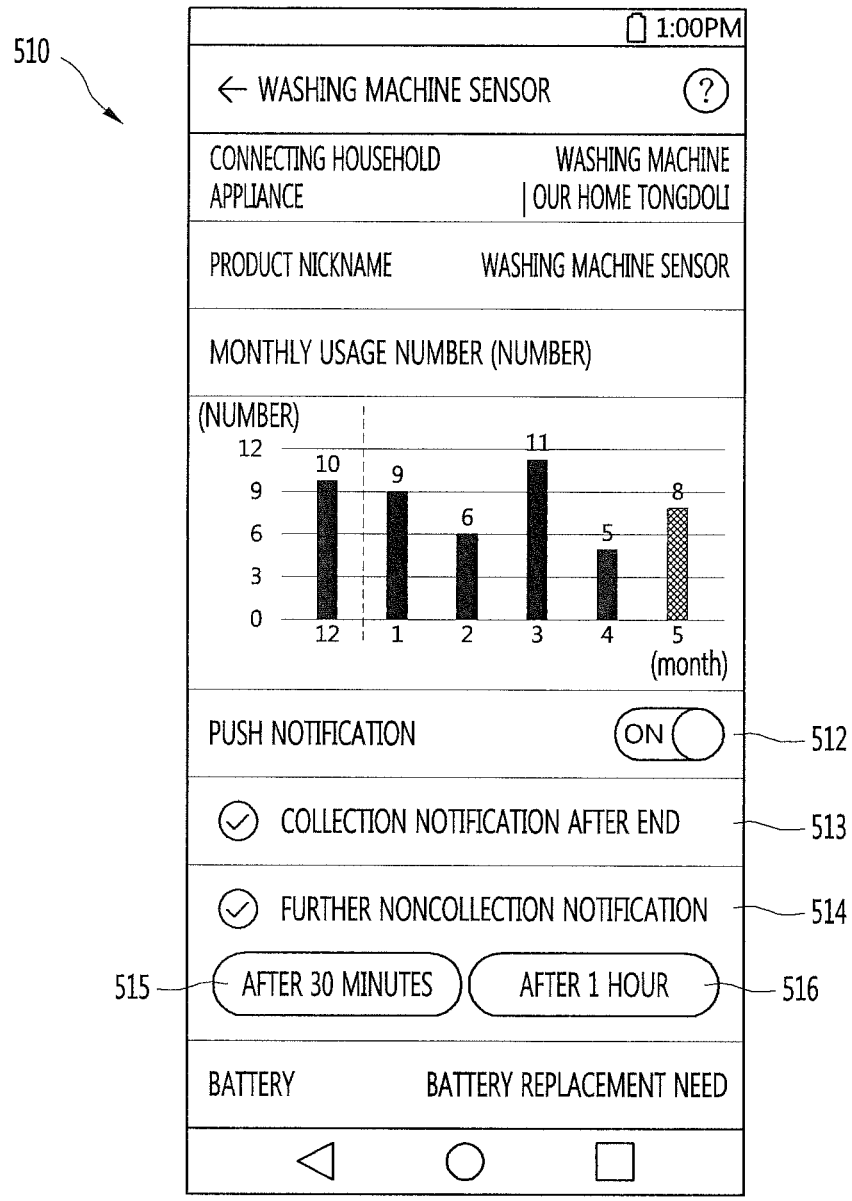
FIG. 7 is a view illustrating a first screen displayed at a mobile device.
Figure 8:
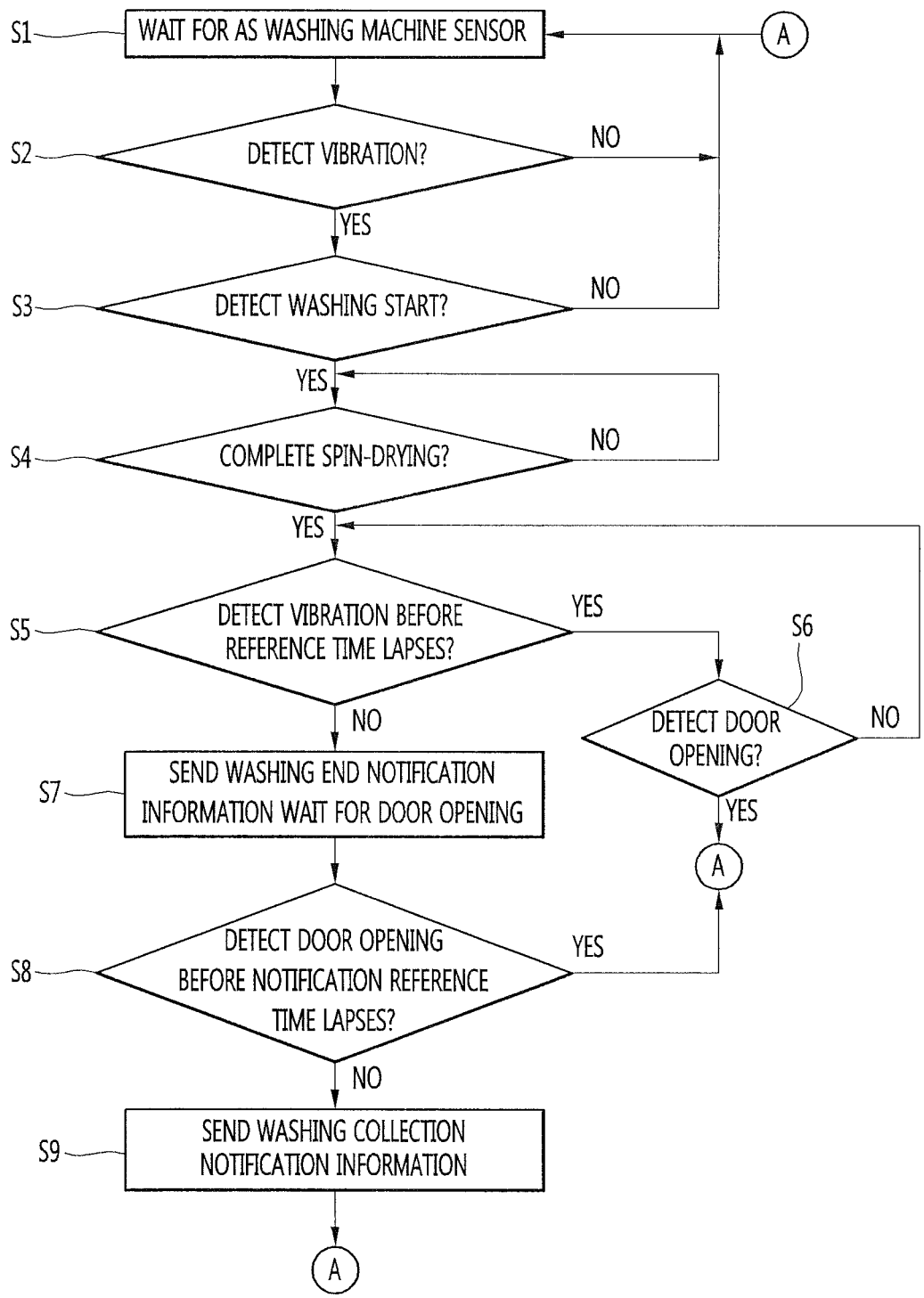
FIG. 8 is a flow chart illustrating an operating algorithm of the sensing device when the sensing device is attached to the washing apparatus.

FIG. 6 is a view illustrating a state where the sensing device is attached to the washing device, FIG. 7 is a view illustrating a first screen displayed at a mobile device, and FIG. 8 is a flow chart illustrating an operating algorithm of the sensing device when the sensing device is attached to the washing apparatus and used.

First, with reference to FIG. 6 and FIG. 7, a function of the sensing device 10 is capable of being selected in a pairing process between the sensing device 10 and the mobile device 50.

The sensing device 10 is capable of performing a function related to the washing apparatus 22 as an example.

The sensing device 10 may be attached to a door 22a of the washing device 22, but it is not limited to this.

A user is capable of selecting a function of the sensing device 10 and inputting a name of the function on a first screen 510 displayed on the mobile device 50.

In addition, a selection portion 512 for selecting where or not a push notification function is used may be displayed on the first screen 510.

When the push notification function is selected, multiple types of notification functions may be individually selected at the first screen 510. As an example, a first selection portion 513 for selecting a first notification function for inducing laundry collection after completion of washing of the washing apparatus 22.

The first notification function may be a function which is performed immediately after a washing completion of the washing apparatus 22 may be displayed on the first screen 510.

A second selection portion 514 for selecting a second notification function for once again inducing laundry collection after performing the first notification function may be further displayed on the first screen 510.

At least one time selection portions 515 and 516 for selecting time which generates notification may be further displayed on the first screen 510.

In other words, waiting time from the time point when the first notification function is performed to the time point when the second notification function is performed may be selected.

When a usage target and a function of the sensing device is selected in the mobile device 50, the sensing device 10 receives a selected function from the mobile device 50 and then performs corresponding function to the selected function.

With reference to FIG. 8, the sensing device 10 waits as a washing apparatus sensor in a state where the sensing device 10 is attached to the washing apparatus 22 (S1).

The processor 132 is in a deactivated state in a state where the sensing device 10 is in a waiting state.

It may be determined whether or not vibration having value equal to or more than a predetermined value is detected in the acceleration sensor 121, in a state where the sensing device 10 is in a waiting state (S2).

The vibration value detected at the acceleration sensor 121 is greater than activation reference vibration value, in a case where a user allows the door 22a of the washing apparatus 22 to be opened in order to use the washing apparatus 22.

Accordingly, the acceleration sensor 121 activates the processor 132, in a case where vibration value detected at the acceleration sensor 121 is larger than the activation reference vibration value.

The processor 132 is capable of determining whether or not washing start is detected after the processor 132 is activated (S3). As an example, the processor 132 is capable of determining whether or not the vibration is detected until reference time lapses after the processor 132 is activated. In addition, the processor 132 is capable of determining whether or not a vibration pattern determined at the acceleration sensor 21 is the same as a reference pattern.

The processor 132 is capable of repeating an active state and a sleep state at a constant period after the processor 132 is activated.

For example, in a state where the processor 132 is activated, the processor 132 may be in the active state during a first reference time and may be in the sleep state during a second reference time. This state change may be repeatedly performed.

As a determination result in a step S3, after the processor 132 is activated, when it is determined that the washing start is not detected, the processor 132 may be again converted into a deactivated state. In other words, the sensing device 10 may be in the waiting state again.

On the other hand, as a determination result in a step S3, after the processor 132 is activated, when it is determined that the washing start is detected, the processor 132 is capable of determining whether or not spin-drying is completed (S4). In general, the washing apparatus 22 is capable of performing a washing process, a rinsing process, and a spin-drying process, and the washing course may be ended when the spin-drying is completed.

Accordingly, the processor 132 is capable of determining whether or not the spin-drying is completed in order to determine a completion of the washing course (S4).

In the present specification, conversion period between the active state and the sleep state of the processor 132 in the washing process is the same as or different from the conversion period between the active state and the sleep state of the processor 132 in the spin-drying process.

For example, in the spin-drying process, the processor 132 is in the active state during a third reference time and is in the sleep state during a fourth reference time and this state change may be repeatedly performed.

At this time, the third reference time is the same as or different from the first reference time and the fourth reference time is the same as or different from the second reference time. The length of the third reference time may be less than the length of the first reference time. The length of the fourth reference time may be greater than the length of the second reference time in a case where the third reference time is different from the first reference time.

A sum of the first reference time and the second reference time is the same as or different from a sum of the third reference time and the fourth reference time. The sum of the first reference time and the second reference time may be greater than the sum of the third reference time and the second reference time in a case where the sum of the first reference time and the second reference time is different from sum of the third reference time and the fourth reference time.

The processor 132 is capable of determining the washing process and the spin-drying process in a distinguished state from each other, based on the vibration detected from the acceleration sensor 21.

As a determination result in a step S4, when it is determined that the spin-drying is completed, the processor 132 may determine whether or not the vibration is detected before the reference time lapses (S4).

According to the washing course, the spin-drying process is performed multiple times and the spin-drying may be performed in the washing process. In this case, it is firstly determined that the spin-drying is ended by detecting the spin-drying process. However, actually, the vibration may be detected before the reference time lapses since the rinsing and washing is proceeded again.

Accordingly, Step S5 may be a step for determining that the washing is substantially ended.

As a determination result in a step S5, when it is determined that the vibration is detected before reference time lapses, it is capable of determining whether or not the opening of the door is detected (S6).

As a determination result in a step S6, when it is determined that he door opening is detected, the processor returns to the step S1. In other words, the processor 132 is converted into the waiting state and then in a deactivated state.

On the other hand, as a determination result in a step S6, the processor 132 determines that the washing is ended. Therefore, the sensing device 10 is capable of sending the washing completion notification information to the mobile device 50. Subsequently, the processor 132 is converted into the door opening waiting state.

The processor 132 is capable of determining whether or not the door opening is detected before the notification reference time lapses (S8).

As a determination result in a step S8, when it is determined that the door opening is not detected before the notification reference time lapses, that is, when it is determined that the door 22a is not opened until predetermined time lapses after the washing is ended in the washing apparatus 22, the sensing device 20 sends information for collection notification to the mobile device 50 (S9). At this time, information for the laundry collection notification may be displayed in the display portion of the mobile device 50.

According to the present embodiment, the sensing device 10 is capable of determining whether or not the washing in the washing apparatus 22 is ended and the door 22a is opened by the sensing device 10 being attached to the washing device even if the washing device does not include a communication module, and the sensing device 10 is capable of sending the information for the washing completion notification and the information for the laundry collection notification to the mobile device. Accordingly, convenience of a user may be improved, since the user is capable of confirming notification information for the laundry collection at the display portion of the mobile device 50.

Further, consumption of the battery 150 may be minimized and thus available period of the battery 150 may be increased since the processor 132 is in a wait state as a deactivated state and then is converted into the activated state by the detection information of the acceleration sensor 121.

Figure 9:
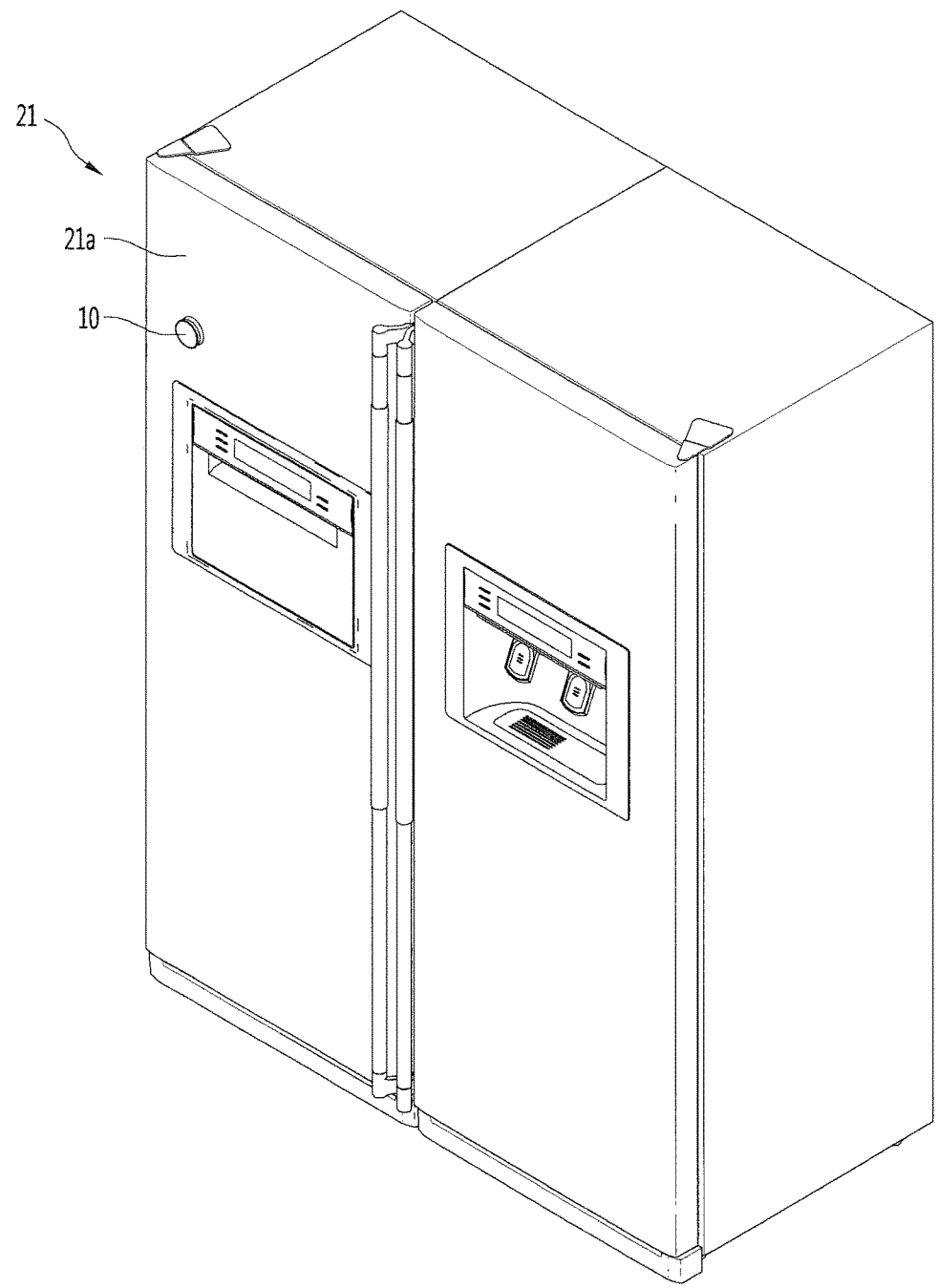
FIG. 9 is a view illustrating a state where the sensing device is attached to a refrigerator.

FIG. 9 is a view illustrating a state where the sensing device is attached to a refrigerator, and FIG. 10 is a view illustrating a second screen displayed at a mobile device.

With reference to FIG. 9 and FIG. 10, the sensing device 10 is capable of performing a function related to a refrigerator 21 as an example.

The sensing device 10 may be attached to a door 21a of the refrigerator 21, but it is not limited to this.

A user is capable of selecting a function of the sensing device 10 and inputting a name of function on a second screen 520 displayed on the mobile device 50.

In addition, a selection portion 521 for selecting where or not a push notification function is used may be displayed on the second screen 520.

When the push notification function is selected, multiple types of notification functions may be individually selected at the first screen 510.

As an example, a first selection portion 522 for selecting a function for managing a storage period of food stored in the refrigerator 21 may be displayed in the second screen 520.

In addition, a food selection portion 526 for selecting a name of a food to be managed by being stored in the refrigerator 21 in the second screen 520 may be displayed on the second screen 520.

A second selection portion 523 for selecting function (referring to as a refrigerator unused-state notification function) for confirming and notifying that the door 21a does not open during a long period of time may be displayed in the second screen 520.

In addition, a period selection portion 524 which is capable of selecting reference period for performing a refrigerator unused-state notification function and a phone number selection portion 525 for selecting a phone number for sending push information when a long time unopened-state of a door is detected may be displayed in the second screen 520.

When a usage target and a function of the sensing device 10 are selected in the mobile device 50, the sensing device 10 receives a selected function from the mobile device 50 and then performs corresponding function to the selected function.

When the refrigerator unused-state notification function is selected in the mobile device 50, the sensing device 10 may be operated in order to performing the selected refrigerator unused-state notification function.

The sensing device 10 may detect whether or not the door 21a of the refrigerator 21 is opened or closed.

At this time, the processor 132 may be converted into the activated state based on the vibration detected at the acceleration sensor 121 while the processor 132 waits in a deactivated state as when the sensing device 10 is used in a state of attaching to the washing device.

The sensing device 10 is capable of determining whether or not the door 21a is opened based on the information detected at the acceleration sensor 121 in a state where the processor 132 is activated.

The sensing device 10 is capable of determining whether or not the door 21a of the refrigerator 21 is opened from the previous door opening point of time or from the point of time recognized that the unused-state notification function is selected during the reference period and sending information for the refrigerator unused-state notification to the mobile device 50 when being determined that the door 21a is in an unopened state.

The information for notifying the refrigerator unused-state may be displayed on the display portion of the mobile device 50 and the mobile device 50 is capable of sending the unused-state notification information to the preselected phone number.

The refrigerator unused-state notification function may be advantageously used in a case where safety of family member which is living in the different area is wondering.

For example, in a case where the refrigerator door in the house of parents has not been opened for a long time, a user checks the case and then the user can call greetings to his/hers parents or goes directly to the house of the parents.

Meanwhile, a user may select the pairing button 126 again in a state the pairing between the sensing device 10 and the mobile device 50 is completed. In this case, the information for notifying that the pairing button 126 is selected is sent to the mobile device 50. According to this, the second screen 520 may be directly displayed on the display portion of the mobile device 50 even if the user does not execute the application.

Finally, the pairing button 126 of the sensing device 10 plays role as a shortcut button for displaying the second screen 520 at the mobile device 50. Naturally, the shortcut button role of the pairing button 126 can be equally applied even in a case where the sensing device 10 performs another function or is used in a state of attaching to other household appliances.

Figure 11:
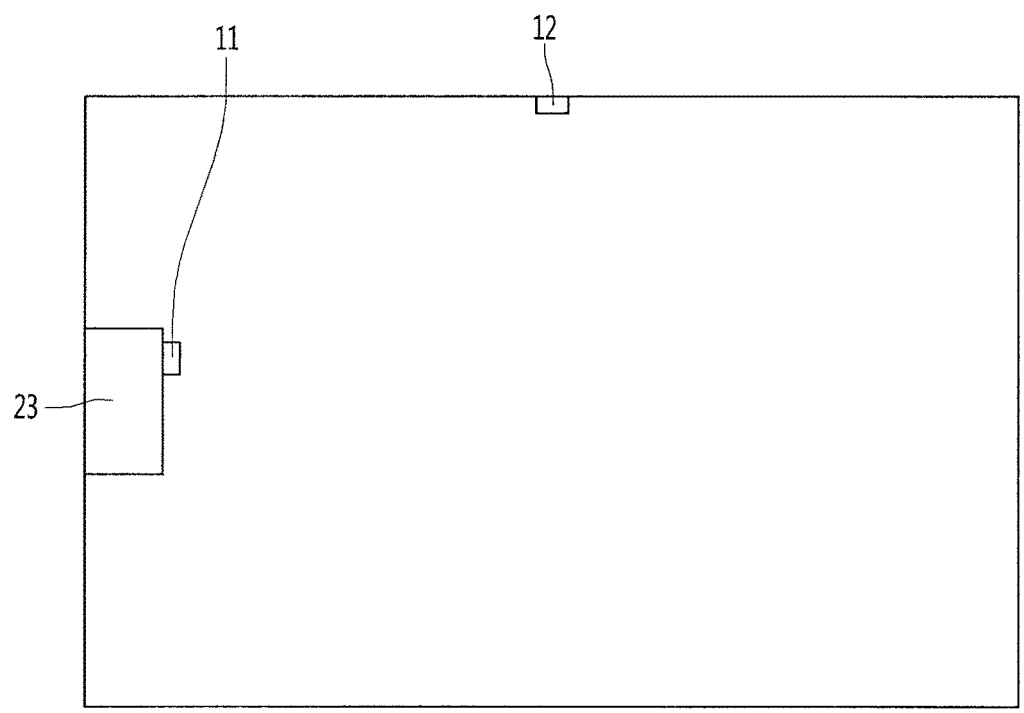
FIG. 11 a view illustrating a state utilizing a plurality of sensing devices.
Figure 12:
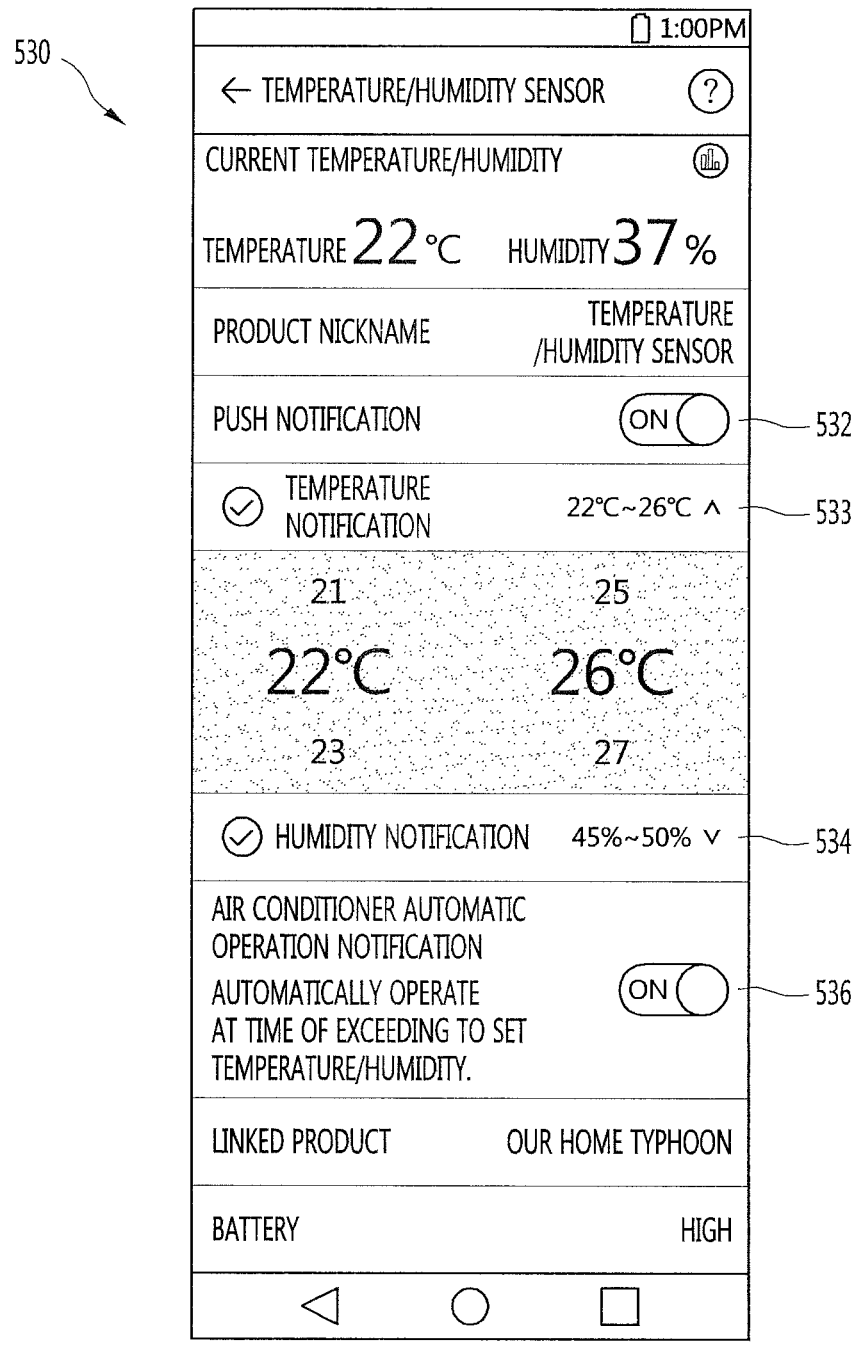
FIG. 12 is a view illustrating a third screen displayed at a mobile device.

FIG. 11 a view illustrating a state utilizing a plurality of sensing devices, and FIG. 12 is a view illustrating a third screen displayed at a mobile device.

With reference to FIG. 11 and FIG. 12, a state of an indoor may be detected using a plurality of sensing devices 11 and 12, and an air conditioner 23 as an example of a household appliances may be controlled. At this time, the air conditioner 23 may be replaced with a humidifier or a dehumidifier, an air purifier, or the like.

Therefore, a first sensing device 11 may be attached to an air conditioner 23 or a position adjacent to an air conditioner 23 and a second sensing device 12 may be attached to a point in the indoor.

At this time, the first sensing device 11 and the second device 12 may be positioned on the same space or may be positioned on the different spaces from each other.

The second sensing device 12 may be set to perform a temperature and/or humidity sensing function and the first sensing device 11 may be set to perform a function for sending a command.

The second sensing device 12 may be set to perform the a temperature and/or a humidity sensing function.

A selection portion 532 for selecting where or not a push notification function is used may be displayed on the third screen 530.

A temperature selection portion 533 for selecting a temperature range and a humidity selection portion 534 for selecting for selecting a humidity range may be further displayed on the third screen 530.

The selected temperature information at the temperature selection portion 533 may be sent to the second sensing device 12.

The second sensing device 12 is capable of detecting a temperature and in a case where the detected temperature is out of the selected temperature range, is capable of sending notification information to the mobile device 50.

The selected humidity information at the humidity selection portion 534 may be sent to the second sensing device 12.

The second sensing device 12 is capable of detecting a humidity and, in a case where the detected humidity is out of the selected humidity range, is capable of sending notification information to the mobile device 50.

An automatic operation function selection portion 536 for setting a function for automatically operating the air conditioner 23 in a cases where the temperature and/or the humidity detected at the second sensing device 12 is out of the set range may be displayed on a third screen 530.

When the automatic operation function is selected, in a case where the mobile device 50 is received the notification information regarding to temperature or the notification information regarding to humidity from the second sensing device 12, an air conditioner operation command may be sent to the first sensing device 11.

In this case, the first sensing device 11 may send the operation command to the air conditioner 23 using the sending unit. Therefore, the air conditioner 23 may be automatically operated.

Figure 13:
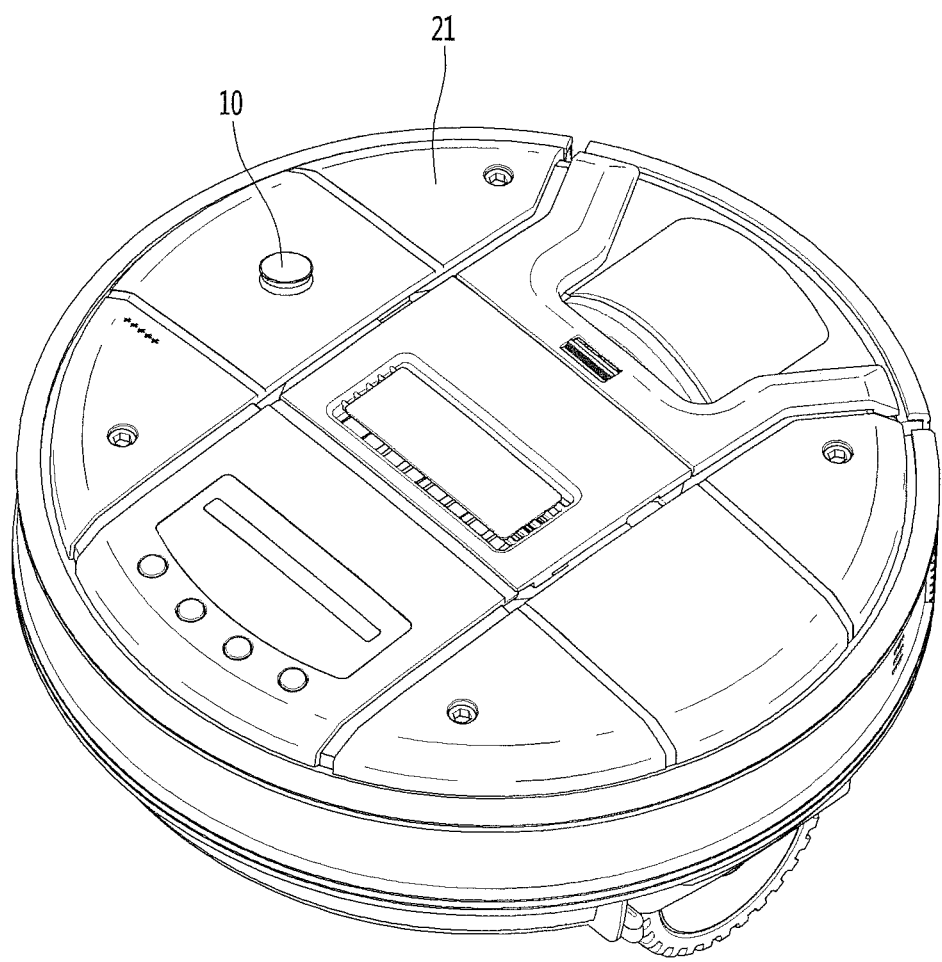
FIG. 13 is a view illustrating a state where the sensing device is attached to a robot cleaner.
Figure 14:
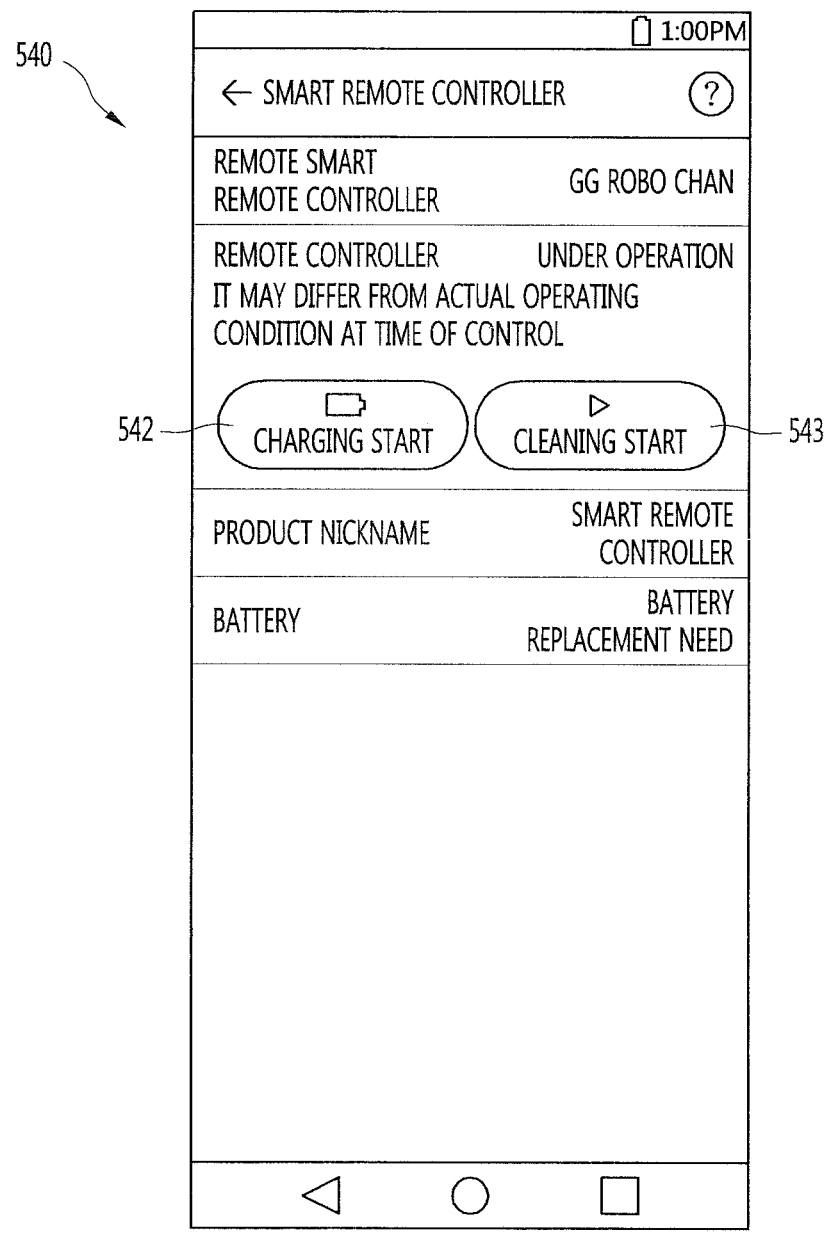
FIG. 14 is a view illustrating a fourth screen displayed at a mobile device.

FIG. 13 is a view illustrating a state where the sensing device is attached to a robot cleaner, and FIG. 14 is a view illustrating a fourth screen displayed at a mobile device.

With reference to FIG. 13 and FIG. 14, the sensing device 10 is capable of performing a command sending function which sends a command for controlling an operation of the household appliances such as a robot cleaner 24. In this case, the mobile device 50 plays a role as a remote controller.

A command sending function of the sensing device 10 may be selected in the mobile device 50.

At least one of a first selection portion 542 for inputting a charging start command of the robot cleaner and a second selection portion 543 for inputting a clean start command may be displayed on a fourth screen 540 of the mobile device 50.

When the first selection portion 542 is selected on the fourth screen 540, the charging start command is sent to the sensing device 10. Then, the sending unit 140 of the sensing device 10 is capable of sending the charging start command to the robot cleaner 24.

When the robot cleaner 24 is received the charging start command, the robot cleaner 24 may move to a charging stand side, dock on the charging stand and start charging, for charging.

When the second selection portion 543 is selected on the fourth screen 540, the clean start command is sent to the sensing device 10. Then, the sending unit 140 of the sensing device 10 is capable of sending the clean start command to the robot cleaner 24.

When the robot cleaner 24 receives the clean start command, the robot cleaner perform the cleaning while automatically traveling in for a period of time.

Since the sensing device 10 may be used in a state the sensing device 10 is attached to the robot cleaner 24, a command may send to the robot cleaner 24 regardless of the position of the robot cleaner 24.

According to the present embodiment, convenience of a user is improved since the robot cleaner 24 may be operated by receiving a command generated from the mobile device 50 from the sensing device 10 even in a case where the robot cleaner 24 does not have a communication module by the sensing device 10 being attached to the robot cleaner 24.

Figure 15:
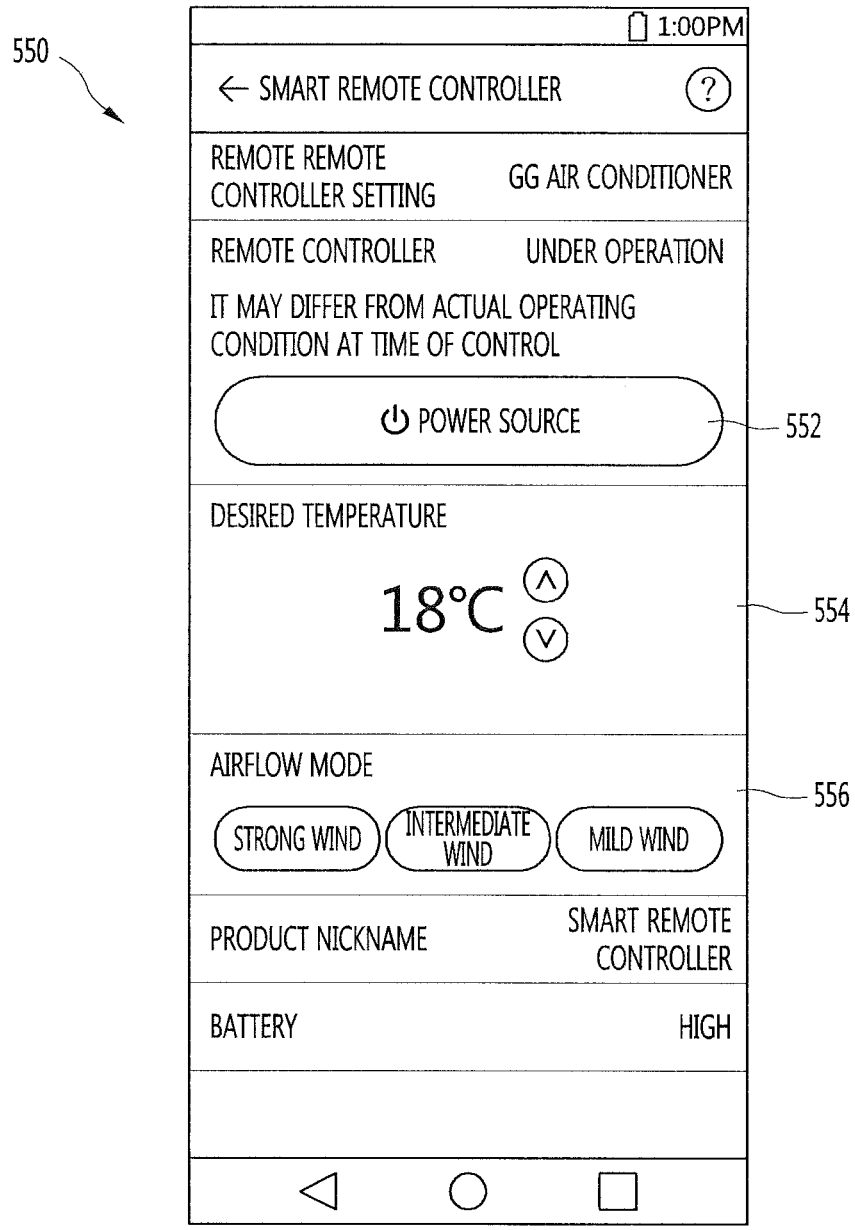
FIG. 15 is a view illustrating a fifth screen displayed at a mobile device.

FIG. 15 is a view illustrating a fifth screen displayed at a mobile device.

With reference to FIG. 15, the sensing device 10 is capable of performing a command sending function which sends a command for controlling an operation of household appliances, an air conditioner 23 as an example. In this case, the mobile device 50 plays a role as a remote controller.

A command sending function of the sensing device 10 may be selected in the mobile device 50.

A fifth screen 550 of the mobile device 50 may display a power source button 552 for selecting turn on or turn off of the power source of the air conditioner on the fifth screen 550 of the mobile device 50.

In addition, at least one of a temperature selection portion 554 for selecting a desired temperature and a flow rate selection portion 556 for selecting a flow rate may be displayed on the fifth screen 550.

When a temperature is selected at the temperature selection portion 554 and a flow rate is selected at the flow rate selection portion 556, the temperature and the flow rate information is sent to the sensing device 10. Then, the sending unit 140 of the sensing device 10 is capable of sending a control command to the air conditioner to satisfy the selected temperature and flow rate by the air conditioner.

The robot cleaner and the air conditioner as an example of household appliances are disclosed in FIG. 13 and FIG. 15. However, there is no limit to the types of household appliances as long as the household appliance is capable of receiving a signal sent from the sending unit.

Figure 16:
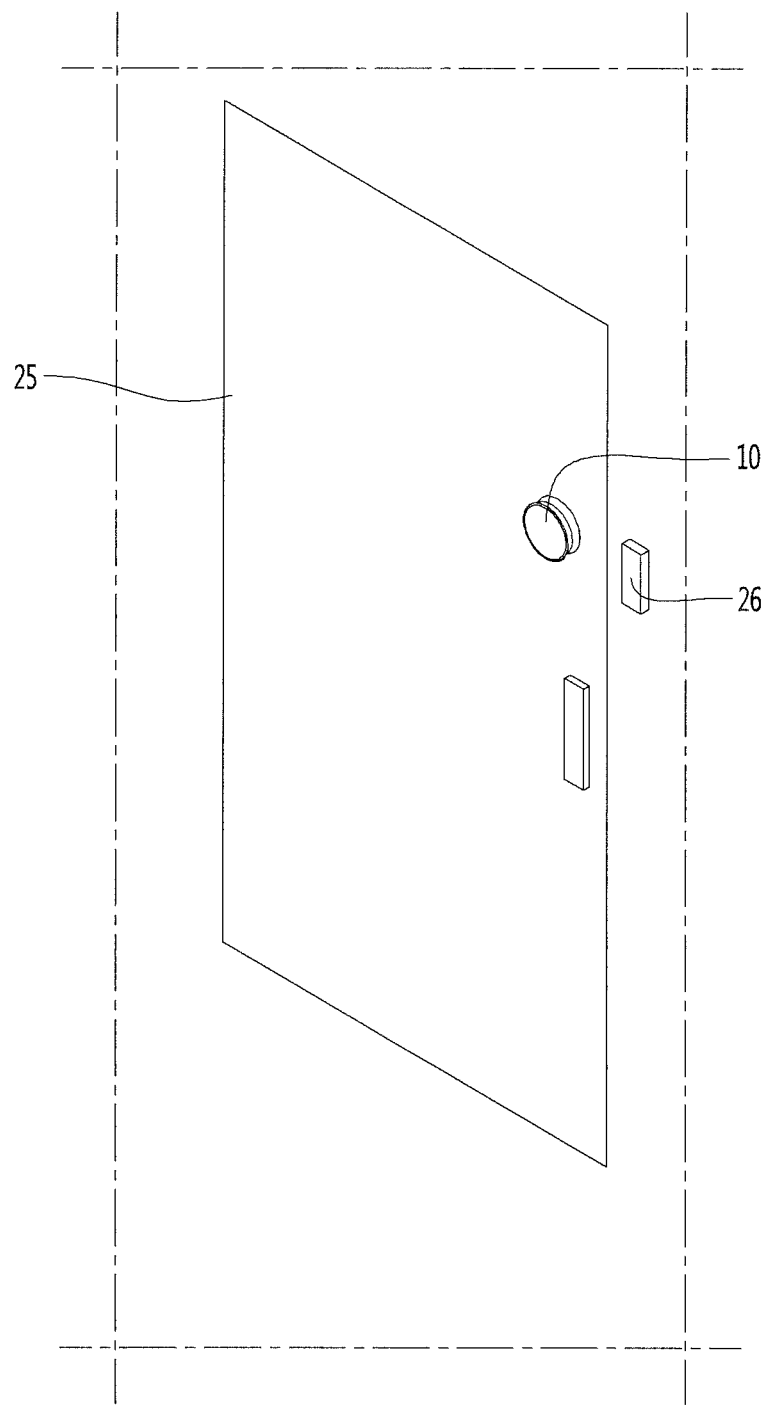
FIG. 16 and FIG. 17 are views illustrating a state where the sensing device is attached to a door. A state where the door closes is illustrated in FIG. 16 and a state where the door opens is illustrated in FIG. 17.
Figure 17:
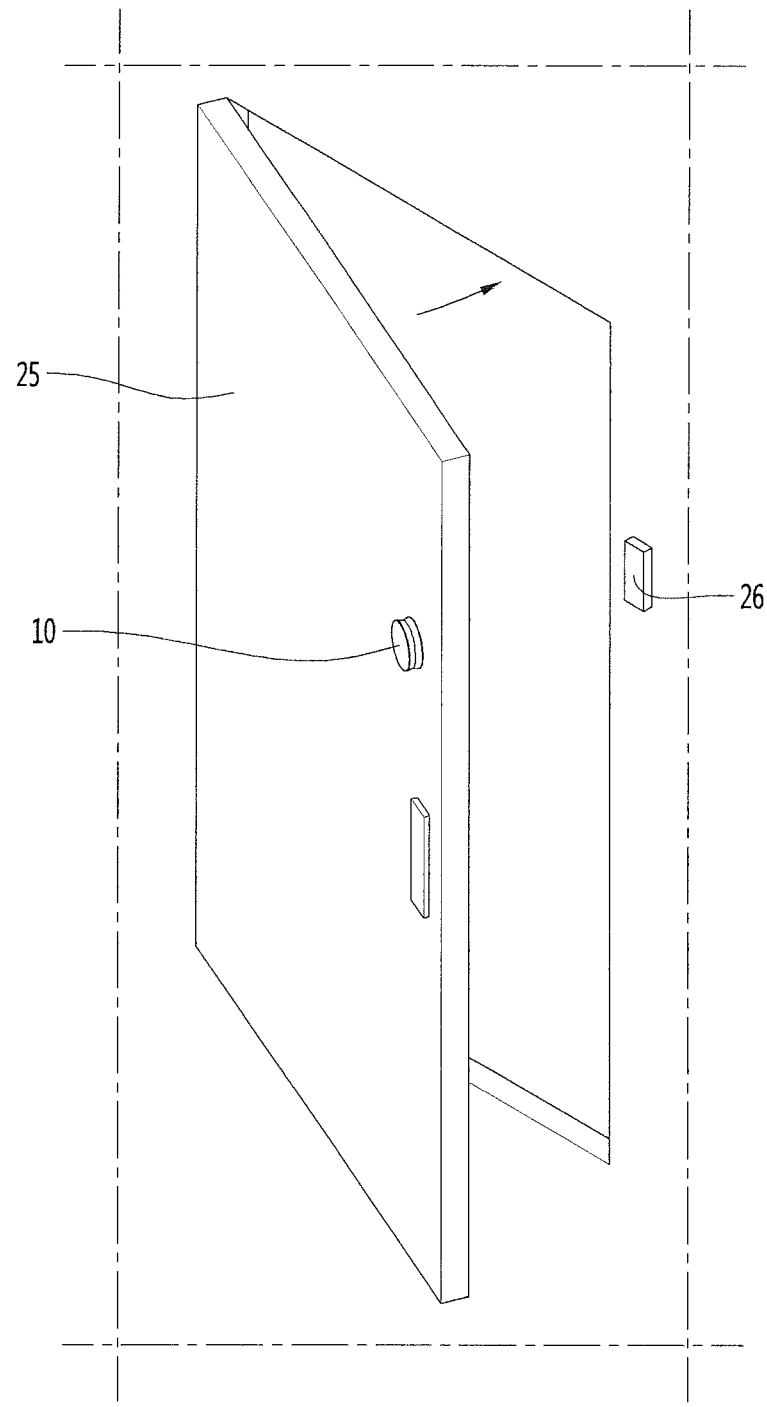
Figure 18:
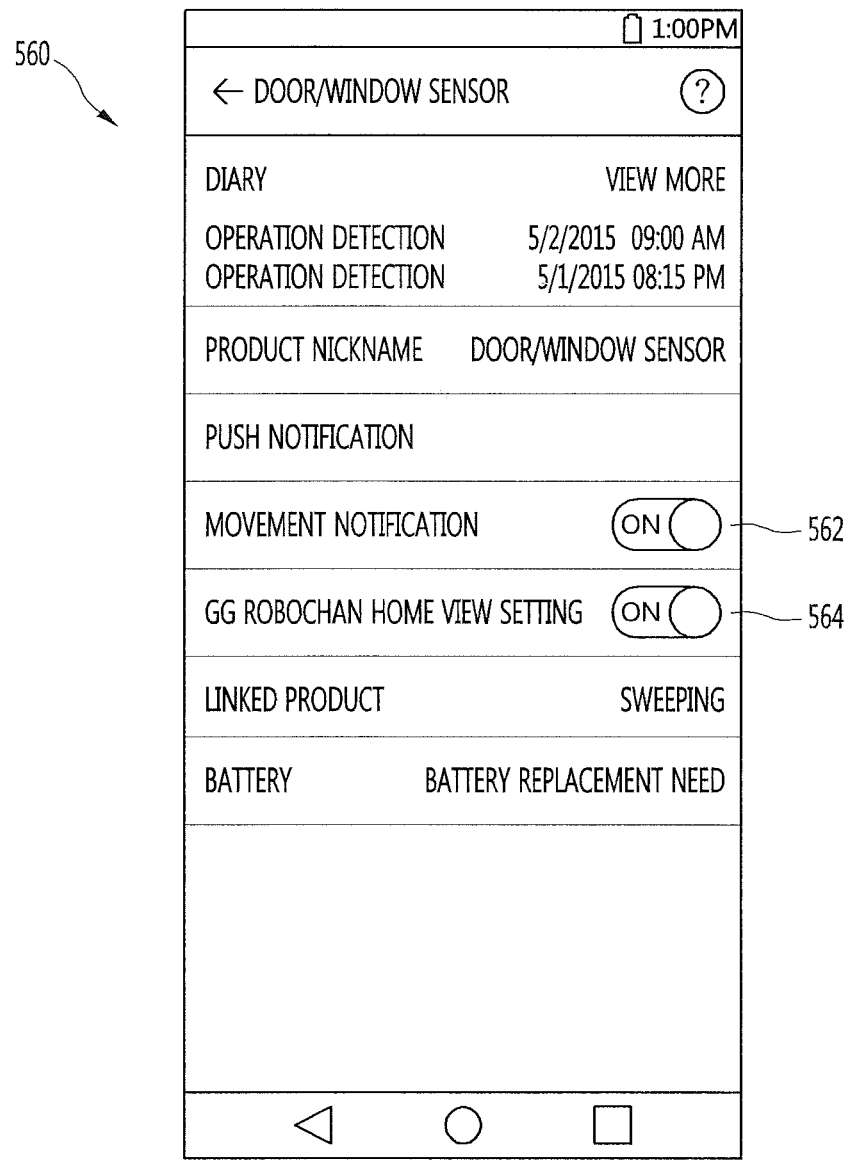
FIG. 18 is a view illustrating a sixth screen displayed at a mobile device.

FIG. 16 and FIG. 17 are views illustrating a state where the sensing device is attached to a door. A state where the door closes is illustrated in FIG. 16 and a state where the door opens is illustrated in FIG. 17. FIG. 18 is a view illustrating a sixth screen displayed on a mobile device.

With reference to FIG. 16 to FIG. 18, the sensing device 10 is capable of performing a door opening detection function by being attaching to a door (including a window) as an example.

A first selection portion 562 for selecting the door opening detection function may be displayed in the sixth screen 560 of the mobile device 50.

In addition, a second selection portion 564 for setting a function for capturing at the camera of the robot cleaner at the time of detecting the door opening may be further displayed on the sixth screen 560.

A reflector 26 may be attached to a position adjacent to the sensing device 10 attached to the door 25.

The proximity sensor 123 of the sensing device 10 may include a light emitting portion and a light receiving portion and the reflector 26 is capable of reflecting light emitted from the light emitting portion and the light receiving portion is capable of detecting light reflected from the reflector 26.

When the door opening detection function is selected in the mobile device 50, the sensing device 10 may be operated in order to perform the selected function.

The sensing device 10 may determine whether or not the door is opened based on information detected at the proximity sensor 123.

At this time, the processor 132 may be activated based on the vibration detected at the acceleration sensor 121 while the processor 132 waits in a deactivated state described above. The processor 132 determines whether or not the door is opened using information detected at the proximity sensor 123 in a state where the processor 132 is activated.

For example, in a state where the door is in an unopened state, light emitted from the light emitting portion is reflected by a reflector 26 and then may reach the light receiving portion and it may be determined that the door is closed in a case where light amount which is equal to or more than the reference light amount reaches in the light receiving portion. On the other hand, in a case where the door is opened, since the light emitted from the light emitting portion is not reflected by the reflector, a light amount which is less than the reference light amount (the light emitted from the light emitting portion does not reach or a portion thereof may reach and the light emitted from an ambient lighting device may reach, but the light amount is less than the reference light amount) is reached in the light receiving portion. Therefore, it is determined that the door is in an opened state.

When the sensing device 10 detects door opening, the sensing device 10 may send the door opening notification information to the mobile device 50 and the door opening notification information may be displayed in the mobile device 50.

The door opening detection function may used in order to confirm the presence or absence of outside intrusion in a case where a user empties home for a long term or only the children is in the home.

In a case where a user owns the robot cleaner and is capable of communicating with the mobile device, the user may select a capturing function by the second selection portion 564.

When the capturing function is selected, in a case where the mobile device 50 receives the door opening notification information from the sensing device 10, the mobile device is capable of sending the capturing function to the robot cleaner. According to this, a camera of the robot cleaner operates and thus is capable of capturing periphery of the robot cleaner and then the captured image may display on the mobile device 50.

When a reset button presses in a state where the sensing device 10 is set to perform any one function described above, the sensing device 10 is initialized and may newly set a function of the sensing device 10.

For example, the sensing device 10 is initialized by reset button selecting while the sensing device 10 is attached to the washing apparatus and used, Subsequently the sensing device 10 is attached to the refrigerator and may be set a new function.

In a case where charging of the battery 150 is required during use of the sensing device 10, light for battery charging notification at the light emitting portion 144 is emitted, and a user confirms light emitted from the light emitting portion 144 and thus whether or not charging of the battery 150 is required may confirm.

In a case where a charging of the battery 150 is required, the first unit 101 is separated from the second unit 102 and a charging cable may connect to the connector 160.

In a state an application of the mobile device 50 is executed, a target selection screen for selecting a target to be used of the sensing device 10 may be displayed on the display portion, and when one target on the target selection screen is selected, one surface among the first to the sixth screens described above may be displayed.

Meanwhile, in a case where the communication module 130 of the sensing device 10 is a Bluetooth module, the sensing device 10 may be directly paired with the mobile device 50.

In this case, in a case where a distance between the sensing device 10 and the mobile device 50 exceeds to a predetermined distance, the pairing between the sensing device 10 and the mobile device 50 is canceled.

Accordingly, the sensing device 10 may use for preventing child from being missed and for confirming position of child. For example, in a case where the sensing device 10 is attached to a child or a bag of a child, and in a case where a distance between the sensing device 10 and the mobile device 50 exceeds a predetermined distance, the mobile device generates notification information. In this case, the user is capable of easily checking a state where a child is away from the mobile device 50 and thus it is possible to prevent a child from being missed.

Further, in a case where the sensing device is attached to a valuable in the same way, it is easily confirmed that whether or not a valuable is missed.

Meanwhile, in a case where the sensing device 10 is installed on household appliances, a door, wall, or the like, the sensing device may be positioned at a predetermined height from the bottom. At this time, in a case where the sensing device 10 inadvertently drops from household appliances, a door, a wall, or the like, the height of the sensing device 10 with respect to the bottom surface is changed. Since the acceleration sensor 121 is capable of detecting a height change difference of the sensing device 10, when a height change in the lower side direction from the acceleration sensor 10 is detected, the sensing device 10 is determined to be present in an abnormal state, and then the sensing device 10 is capable of sending notification information to an external device.

Figure 19:
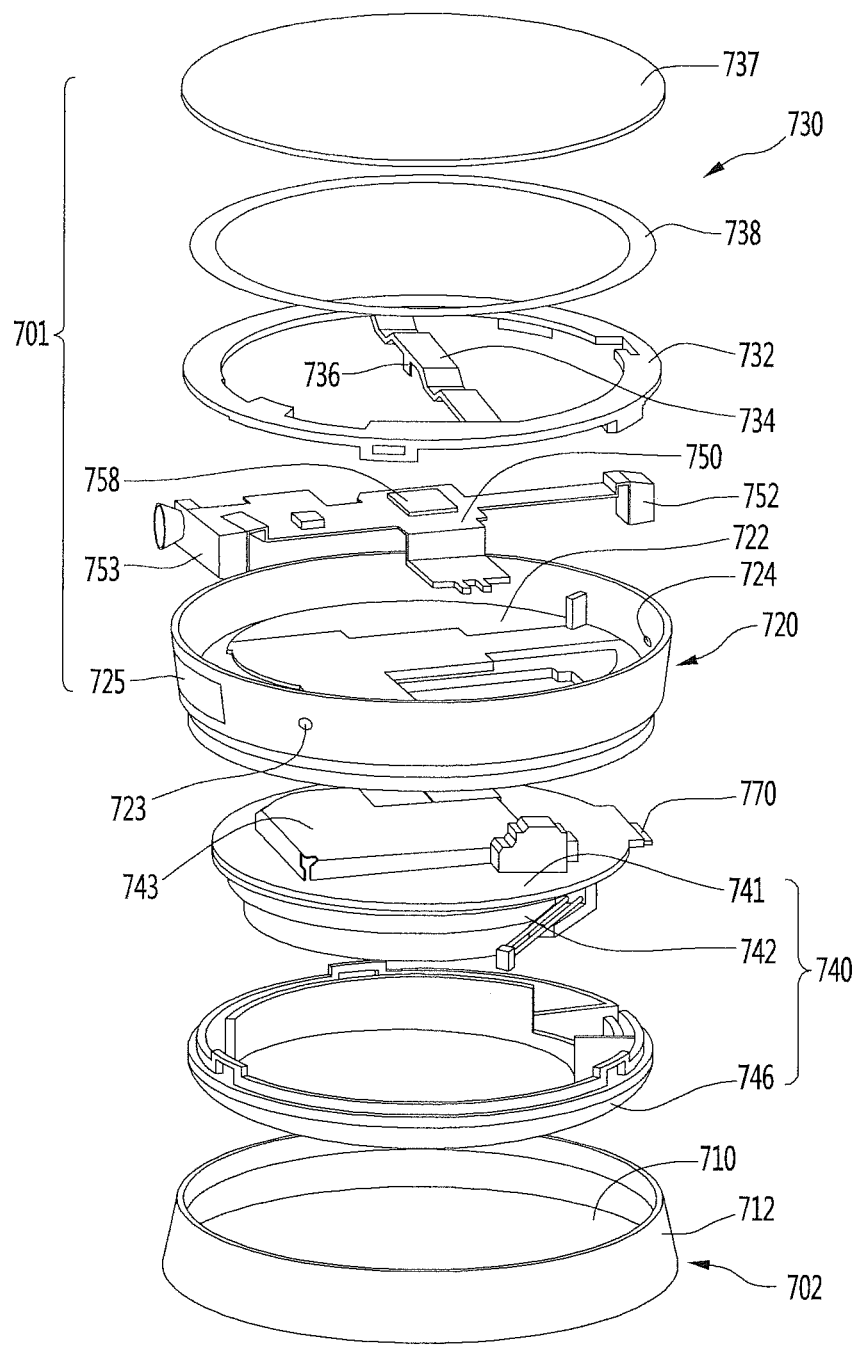
FIG. 19 is an exploded perspective view of a sensing device according another embodiment of the present invention.
Figure 20:
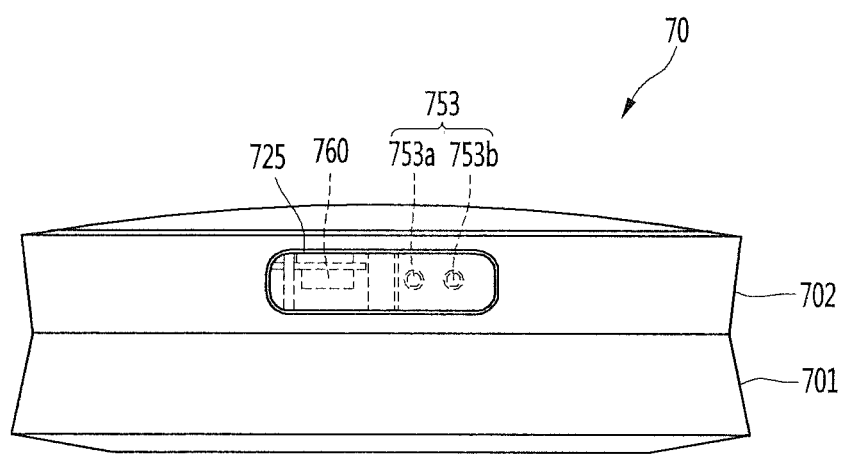
FIG. 20 is a side view of a sensing device according another embodiment of the present invention.

FIG. 19 is an exploded perspective view of a sensing device according another embodiment of the present invention, and FIG. 20 is a side view of a sensing device according another embodiment of the present invention.

The present embodiment is the same as the previous embodiments in the other part except for an internal structure of the sensing device. Accordingly, hereinafter, only the characteristic parts of the present embodiment will be described.

With reference to FIG. 1, FIG. 2, FIG. 19 and FIG. 20, the sensing device 70 according to the present embodiment may include a first unit 701 and a second unit 702 which is separably coupled with the first unit 701.

The second unit 702 may be attached to the household appliances 21 to 24, the wall, the door 25, or the like. As an example, the second unit 702 may be attached to the household appliances 21 to 24, the wall, the door 25, or the like by adhesives, double-side tapes, or the like.

The first unit 701 may be separated from the second unit 702 in a state the second unit 702 is fixed to a specific position.

The second unit 702 may include a housing 710 and a decoration member 712 surrounding the housing 710. A portion of the first unit 701 may be accommodated in the housing 710.

The first unit 701 may include a main body 720. A support plate 722 may be provided on the main body 720. An upper side space and a lower side space may be formed about the support plate 722 in the main body 720.

The first unit 701 may include an upper unit 730. The upper unit 730 may include an upper frame 732 and a transmitting portion 737 seated on the frame 732. The upper frame 732 may be coupled to the upper side of the main body 720 and may support the transmitting portion 737. The transmitting portion 737 may be fixed to the upper frame 732 by the adhesive member 738 such as the double-side tapes 732. The light emitted from a light emitting portion described below may transmit through the transmitting portion 737.

The upper frame 732 may be formed in a ring shape (but, it is not limited to this) and may include a connecting portion 734 which connects two points of the upper frame 732. The connection portion 734 may be disposed to bisect the inside space of the upper frame 732. The strength of the upper frame 762 may be improved and thus deformation thereof may be limited by the connection portion.

A pressing projection 736 for pressing the pairing button 758 may be provided in the connection portion 734. The pressing projection 736 may downwardly extend from the center portion of the connecting portion 734.

The first unit 701 may further include a lower unit 740. The lower unit 740 is coupled to the lower side of the main body 720.

The lower unit 740 may include a main PCB 741. The main PCB 741 may include a communication module 743. As described below, the communication module 743 may include a processor and a memory.

A battery 742 may be disposed on the lower side of the main PCB 741. A connector 770 for inputting power for charging of the battery 742 is provided on the main PCB 741.

The upper unit 740 may be coupled to the upper side of the main body 720 and may include a lower frame 746 which protects the battery 742. The battery 742 may be seated on the lower frame 746.

The first unit 701 may further include a sensing module. The sensing module may include a sensor supporter 750, a proximity sensor 753 installed on the sensor supporter 750, and a temperature and humidity sensor 752.

The pairing button 758 may be installed on the sensor supporter 750. At this time, the proximity sensor 753 and a temperature and humidity sensor may be disposed on the opposite side to the pairing button 758. The proximity sensor 753 may include a light emitting portion 753a and a light receiving portion 753b.

A sending unit 760 for sending a signal to the household appliances 21 to 24 may be installed in the sensor support 750. At this time, the sending unit 760 may be positioned adjacent to the proximity sensor 753. A transmissive window 725 for transmitting light may be provided in the main body 720.

The transmissive window 725 may be disposed to face the sending unit 760 and the proximity sensor 753.

In addition, the sensing module may further include the acceleration sensor (see 121 in FIG. 5) installed on the main PCB 741. However, the position of the acceleration sensor is limited to this and it is also possible for the acceleration sensor to be installed on the sensor supporter 750.

The sensor support 750 may be disposed on the upper side space of the main body 720. An air flowing hole 724 for enabling flowing of air may be formed on the main body 720. The air flowing hole 724 may be disposed to face the temperature and humidity sensor 752. Accordingly, according to the present embodiment, the temperature or the humidity of outside of the sensing device 10 may accurately detect in the temperature and humidity sensor 724 by the air flowing hole 724.

At this time, a cap (not illustrated) for waterproofing to prevent liquid from being entered through the air flowing hole 724 is capable of covering the air flowing hole 724.

A portion of the first unit 701 may be inserted in the second unit 702. At this time, as in FIG. 20, when a portion of the first unit 701 is inserted into the second unit 702, the connector 770 is not exposed to the outside of the sensing device 70. Accordingly, it may be prevented foreign substances or water from being introduced into the connector 160 in a state where the first unit 701 and the second unit 702 are coupled with each other.

On the other hand, when a portion of a first unit 701 is inserted into a second unit 702, the transmissive window 725, a reset-hole 723 and the air flow hole 722 may be exposed to the outside.

The first unit 701 may further include a sending unit 760 for sending a signal to the household appliances 21 to 24.

The sending unit 760 is capable of sending a signal including an operation relating command to the household appliances 21 to 24. The sending unit 760 is capable of sending an infrared signal as an example.

However, the household appliances 21 to 24 are capable of receiving a signal sending at the sending unit 760 in a case where the household appliances 21 to 24 include a signal receiving portion.

The first unit 701 may further include a light emitting portion (see 144 in FIG. 5) for displaying state information of the sensing device 10. The light emitting portion may include at least one LED and may be installed on the sensor supporter 750 or the main PCB (741), but it is not limited to this.

The light emitting portion is capable of displaying a variety of information such as a state of battery 742, whether or not being connected to communicate with an external device (a server, a mobile device, or the like), an error generating state. Colors of light emitted from the light emitting portion may be changed according to the state of battery 742, whether or not being connected to communicate with an external device (a server, a mobile device, or the like), the error generating state.

The first unit 701 may further include a reset button (see 180 in FIG. 5). A reset hole 723 through which tool such as a pin for pressing a reset button passes may be formed in the main body 720.

The above description describes the technical idea of the present invention only by way of example. Accordingly, it should be understood that numerous other modifications and embodiments can be devised by those skilled in the art that will fall within the spirit and scope of the principles of this disclosure. Accordingly, embodiments disclosed in the present invention are for illustrating but not for limiting the technical scope of the present invention, the scope of the technical spirits of the present invention is not limited by the embodiments disclosed in the present invention.

What is claimed is:

1. A sensing device, comprising:
a first unit that includes a sensing module, a battery, a connector that is configured to charge the battery, and an inserting portion; and
a second unit defining a space that receives the inserting portion of the first unit,
wherein the connector is located at the inserting portion of the first unit,
wherein the sensing module includes an acceleration sensor,
wherein the first unit further includes:
a communication module that is configured to receive information from the sensing module and that includes a processor and memory, and
a battery that is configured to supply power to the processor,
wherein the acceleration sensor is configured to activate the processor in response to detecting vibration that is greater than a reference vibration for activation based on the processor not being active,
wherein the processor is configured to:
detect starting of a washing apparatus based on the processor being active,
be active during a first reference period of time and is configured to be in a sleep state during a second reference period of time, and
distinguish a washing cycle from a spin-drying cycle of the washing apparatus based on vibration detected by the acceleration sensor, and
wherein each one of first reference periods of time during the washing cycle is different than each one of second reference periods of time during the spin-drying cycle.

2. The sensing device of claim 1, wherein the sensing module further includes a proximity sensor that includes a light emitting portion and a light receiving portion.

3. The sensing device of claim 2, wherein:
the first unit includes a transmissive window that is configured to transmit light emitted from the light emitting portion, and
the transmissive window is located on an outside of the sensing device based on the first unit being coupled to the second unit.

4. The sensing device of claim 3, further comprising:
a sending unit that is configured to transmit a command from the sensing unit by emitting light towards the transmissive window.

5. The sensing device of claim 2, wherein:
the sensing module further includes a temperature/humidity sensor that is configured to detect at least one of temperature or humidity,
the first unit further includes a main body that defines an inner space configured to receive the sensing module, the main body comprising a support plate that partitions the inner space of the main body into an upper side space and a lower side space,
the main body defines an air flow hole that is configured to receive air from outside the sensing device and that is adjacent to the temperature/humidity sensor.

6. The sensing device of claim 1, wherein the processor is configured to transmit a notification information to an external device that is configured to communicate with the communication module in response to the light receiving portion receiving light that is less than a reference light amount.

7. The sensing device of claim 6, wherein the notification information indicates an instruction to open a door that is associated with the sensing device.

8. The sensing device of claim 2, wherein:
the processor is configured to:
   detect a completion of the spin-drying cycle of the washing apparatus using the acceleration sensor, and
   transmit a washing end notification to an external device in response to not detecting vibration until a reference time elapses based on the sensing device being connected to the washing apparatus.

9. The sensing device of claim 8, wherein the processor is further configured to transmit laundry collection notification information to the external device based on determining that a door of the washing apparatus has not been opened within a notification reference time after transmission of the washing end notification.

10. The sensing device of claim 8, wherein the processor is configured to deactivate in response to determining that a door of the washing apparatus opened during a reference period of time after the spin-drying cycle of the washing apparatus completed.

11. The sensing device of claim 1, wherein:
the first unit further includes:
   a reset button that is configured to reset information stored in the memory, and
   a main body that is configured to receive the sensing module and that defines a reset hole that is configured to receive a tool that is configured to press the reset button.

12. A sensing device that is connected to a washing apparatus, the sensing device comprising:
an acceleration sensor;
a communication module that is configured to communicate with an external device and that includes (i) a processor that is configured to determine a state of the washing apparatus based on information from the acceleration sensor and (ii) memory; and
a battery that is configured to supply power to the processor,
wherein the processor is configured to:
   distinguish a washing cycle from a spin-drying cycle of the washing apparatus based on vibration detected by the acceleration sensor,
   in the washing cycle, be active during a first reference period of time and be in a sleep state during a second reference period of time,
   in the spin-drying cycle, be active during a third reference period of time and be in a sleep state during a fourth reference period of time,
wherein:
   the first reference period is different than the third reference period,
   the second reference period is different than the fourth reference period, or
   the first reference period is different than the third reference period, and the second reference period is different than the fourth reference period.

13. The sensing device of claim 12, wherein the processor is further configured to:
detect a completion of the spin-drying cycle of the washing apparatus using the acceleration sensor, and
transmit a washing end notification to the external device in response to not detecting vibration using the acceleration sensor until a reference time elapses.

14. The sensing device of claim 13, wherein the processor is further configured to transmit laundry collection notification information to the external device based on determining that a door of the washing apparatus has not been opened within a notification reference time after transmission of the washing end notification.

15. The sensing device of claim 13, wherein the processor is further configured to be deactivated in response to determining that a door of the washing apparatus has opened within a reference period of time after the completion of the spin-drying cycle of the washing apparatus.

16. The sensing device of claim 12, wherein a length of the third reference time is less than a length of the first reference time, or a length of the fourth reference time is greater than a length of the second reference time.

* * * * *